United States Patent
Ekberg

(10) Patent No.: US 8,336,084 B2
(45) Date of Patent: Dec. 18, 2012

(54) COMMUNICATION USING MULTIPLE APPARATUS IDENTITIES

(75) Inventor: Jan-Erik Ekberg, Vanda (FI)

(73) Assignee: Nokia Corporation, Espoo (FI)

( * ) Notice: Subject to any disclaimer, the term of this patent is extended or adjusted under 35 U.S.C. 154(b) by 529 days.

(21) Appl. No.: 12/557,761

(22) Filed: Sep. 11, 2009

(65) Prior Publication Data

US 2011/0066850 A1    Mar. 17, 2011

(51) Int. Cl.
*H04L 29/06*   (2006.01)
(52) U.S. Cl. ............ 726/4; 713/151; 713/162; 713/168; 726/28; 726/29; 380/247; 380/249; 380/262; 380/264
(58) Field of Classification Search .................. 713/151, 713/162, 168; 726/4, 28, 29; 380/247, 249, 380/262, 264
See application file for complete search history.

(56) References Cited

U.S. PATENT DOCUMENTS

| | | | |
|---|---|---|---|
| 7,809,361 B2 * | 10/2010 | Ekberg et al. .............. 455/414.1 |
| 2005/0041813 A1 * | 2/2005 | Forest et al. .................. 380/262 |
| 2007/0250713 A1 * | 10/2007 | Rahman et al. ............... 713/171 |
| 2009/0262662 A1 * | 10/2009 | Ramachandran et al. .... 370/254 |
| 2010/0214959 A1 * | 8/2010 | Kuehnel et al. ............... 370/255 |
| 2010/0303236 A1 * | 12/2010 | Laaksonen et al. ........... 380/270 |

OTHER PUBLICATIONS

Jan-Erik Ekberg, Implementing Wibree Address Privacy, Sep. 16, 2007, IWSII 2007—First International Workshop for Spontaneous Interaction, retrieved from http://www.comp.lancs.ac.uk/iwssi2007/papers/iwssi2007-07.pdf on Nov. 17, 2011.*

* cited by examiner

*Primary Examiner* — Carl Colin
*Assistant Examiner* — Gary Lavelle
(74) *Attorney, Agent, or Firm* — Locke Lord LLP

(57) ABSTRACT

A system for broadcasting multiple public identities corresponding to the same apparatus. For example, each public identity may correspond to different operational environments, while none of the public identities disclose a private identity that uniquely and permanently identifies the apparatus. This allows apparatuses to keep their unique identity a secret while still being able to communicate with other apparatuses in various environments.

19 Claims, 14 Drawing Sheets

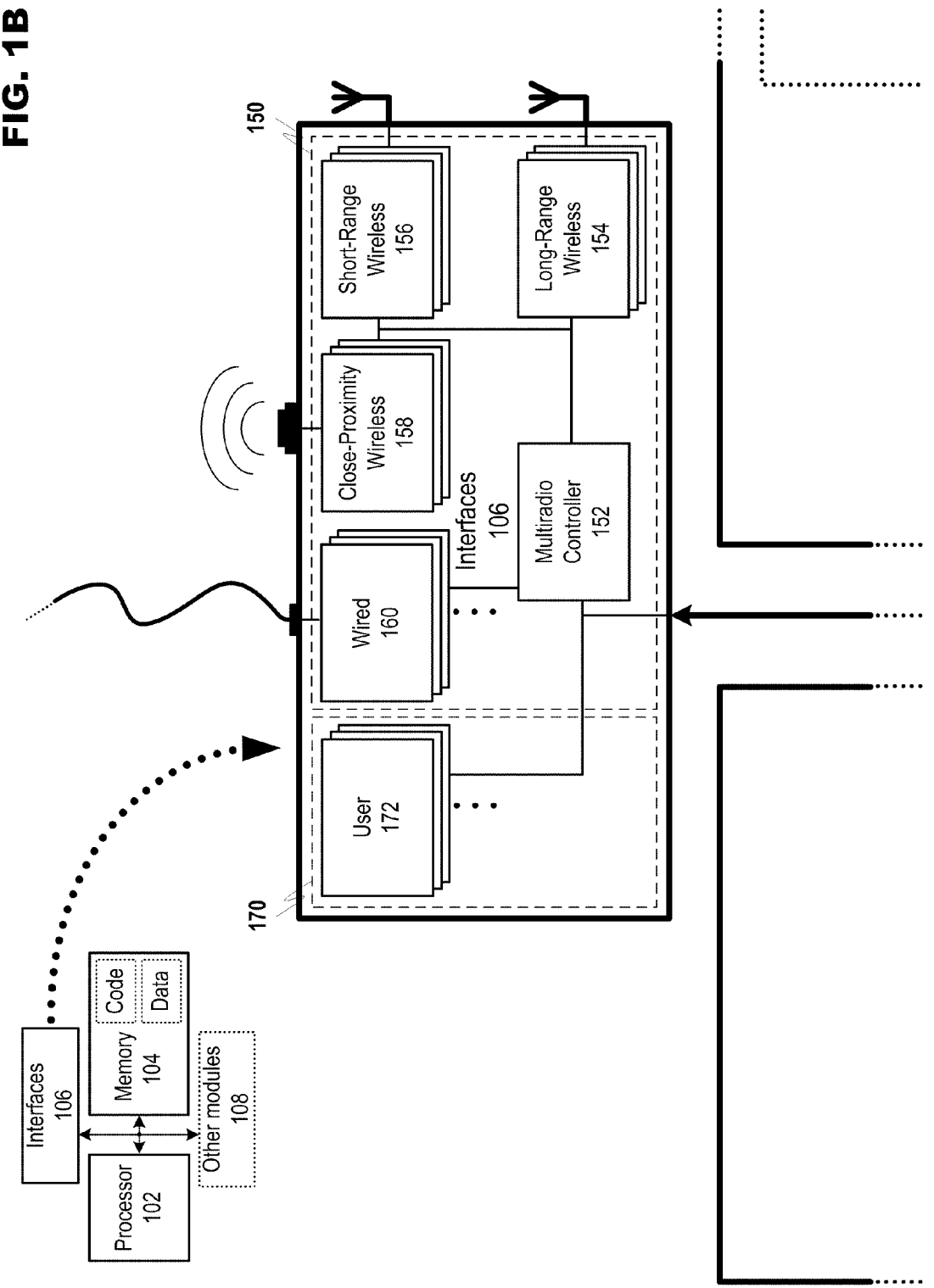

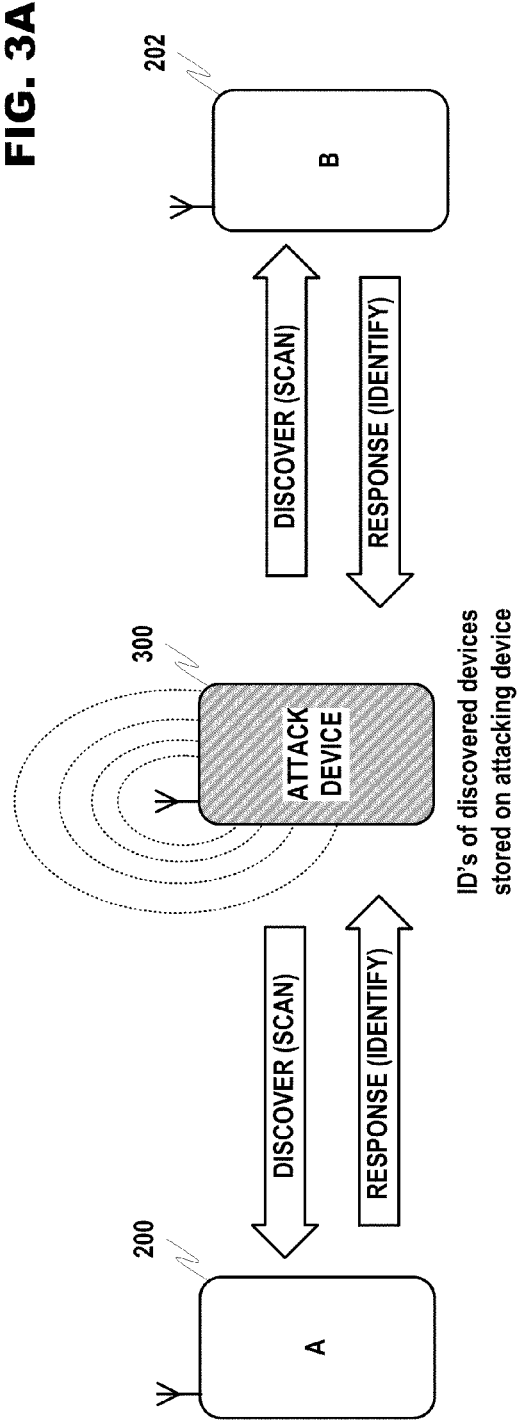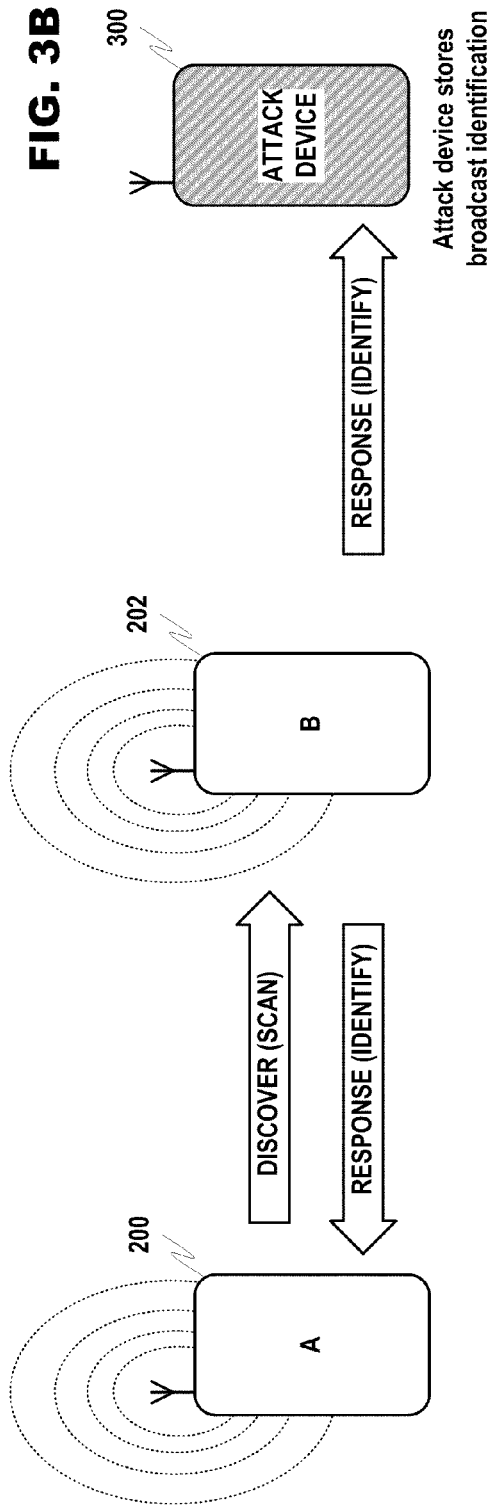

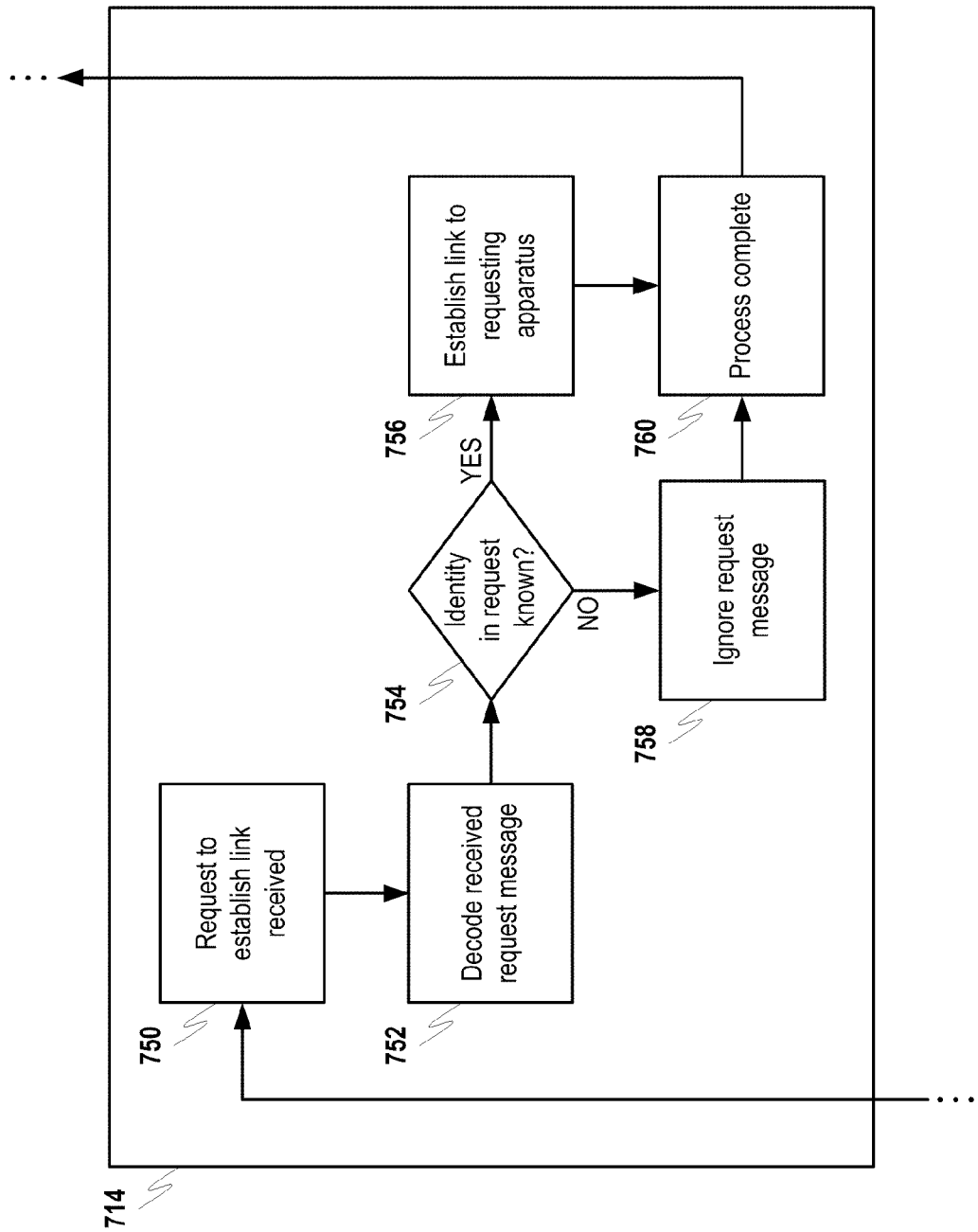

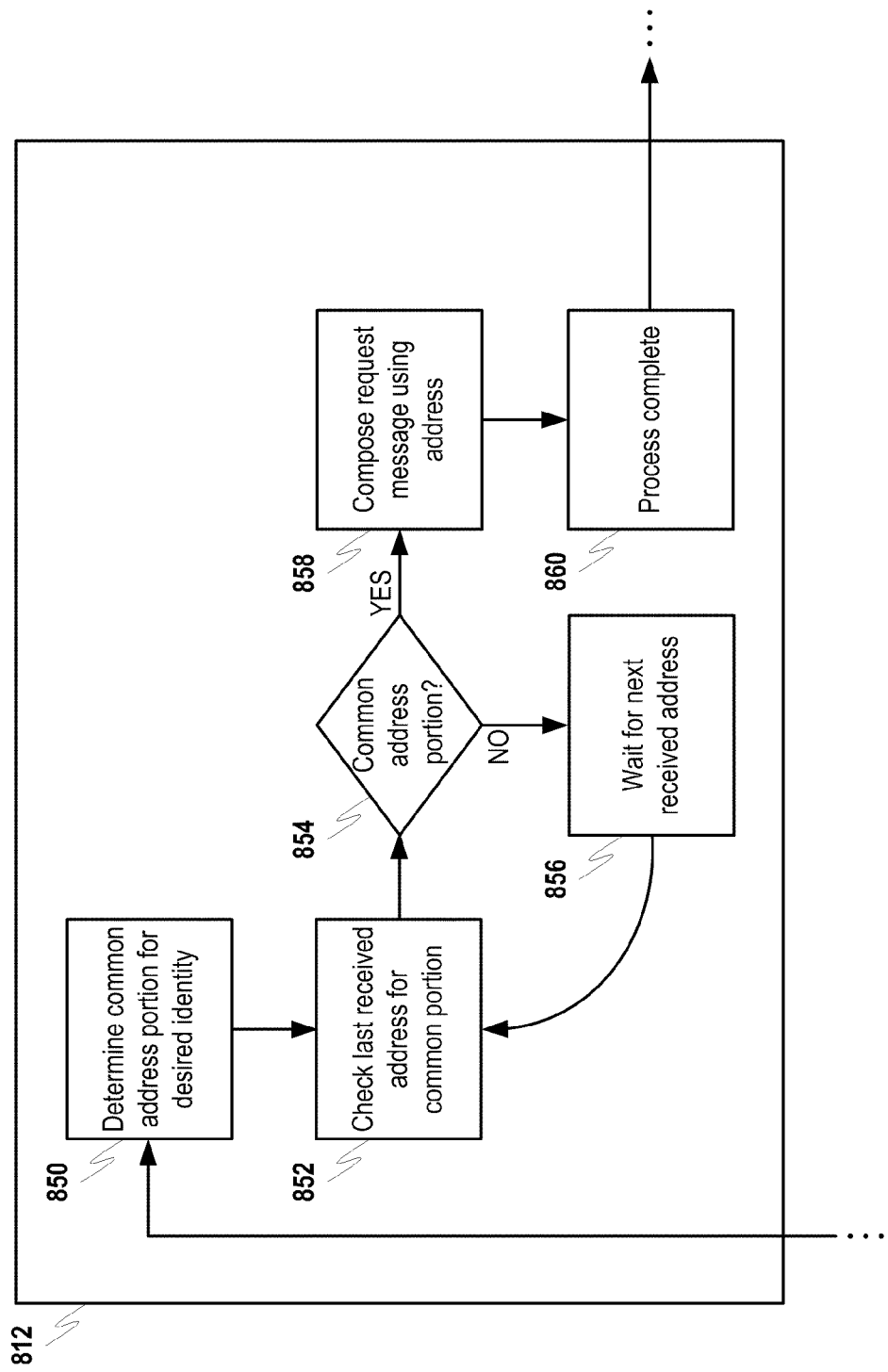

COMMUNICATION USING MULTIPLE APPARATUS IDENTITIES

BACKGROUND OF THE INVENTION

1. Field of Invention

The present invention relates to secure wireless communication, and more specifically, to negotiating wireless communication links between apparatuses in a secure manner when at least one of the apparatuses is associated with multiple apparatus identities.

2. Background

Utilization of wireless technology continues to accelerate due to widespread demand for communication functionality. This is evident in expanding number of apparatuses that now employ some sort of communication functionality. Communication between such apparatuses may occur within formal network groups or via ad-hoc-type interactions, wherein links are established using one or more wireless communication transports. The wireless communication transports employed for a transaction may depend on the requirements of the interaction. For instance, characteristics such as speed, data capacity, error handling, security, etc. may make certain wireless communication transports more suitable for certain interaction.

Further to the above, some inter-apparatus communication scenarios may require a level of security that at least prevents possibly malicious apparatuses from obtaining private or sensitive data. For secure transactions, the strategies employed in many wireless communication transports may rely upon user and/or apparatus identity. Ensuring a safe connection to another apparatus may, for example, include a determination as to whether the other apparatus is known. The identities of trusted apparatuses may therefore be stored to expedite later connection.

While the storing of identification information corresponding to known devices may help expedite connection to known apparatuses, this practice may also create an unexpected security issue in that proliferates the availability of apparatus identities. For example, it may be possible for another entity to obtain this stored identification information for use in malicious activities that may be carried out using an impersonated apparatus identity. It may therefore be beneficial to, in some instances, utilize a separate public identity that is distinct from an identity that corresponds to a particular apparatus in order to enhance the level of security in interactions.

SUMMARY OF INVENTION

Various embodiments of the present invention may comprise a method, computer program product, apparatus and system for broadcasting multiple public identities corresponding to the same apparatus. For example, each public identity may correspond to different operational environments, while none of the public identities disclose a private identity that uniquely and permanently identifies the apparatus. This allows apparatuses to keep their unique identity a secret while still being able to communicate with other apparatuses in various environments.

Example implementations may comprise apparatuses having one or more public identities that can be broadcast via wireless communication. These public identities may each correspond to different operating environments. For example, apparatuses may have an identity utilized only in workplace interactions, an identity for social interaction and an identity that is known to family members of the apparatus user. Each of these identities may be known to, and thus recognized by, various apparatuses in each of these operating environments. In particular, the various apparatuses in each environment may be able to recognize each identity based on, for example, prior interaction, and would thereafter permit interaction with recognized apparatuses.

In accordance with at least one embodiment of the present invention, apparatuses may encode each public identity to be transmitted into a separate address. Encoding may utilize a random number and the public identity as inputs, wherein the random number may change in view of various criteria (e.g., new random numbers may be computed after each transmission session, after a particular amount of time, etc.). The encoded identity may then be concatenated with the random number in order to form a broadcast address. Each broadcast address is then transmitted via wireless communication. The order of broadcast address transmission may depend on, for example, a broadcast address priority determined in the broadcasting apparatus.

Other apparatuses that receive broadcast addresses via wireless communication may decode each address in order to determine the public identity contained within. The public identity may then be compared to identities previously encountered by the receiving apparatuses in order to determine if the broadcasting apparatus is known. If the public identity is determined to be known, the receiving apparatus may respond to broadcasting apparatus in due course, but before the transmission of the next encoded address. For instance, the broadcasting address will be listening for responses to the last broadcast address before the next address is transmitted. A response received in the broadcasting apparatus that includes information pertaining to the previously broadcast address may trigger further communication with the responding apparatus.

The above summarized configurations or operations of various embodiments of the present invention have been provided merely for the sake of explanation, and therefore, are not intended to be limiting. Moreover, inventive elements associated herein with a particular example embodiment of the present invention can be used interchangeably with other example embodiments depending, for example, on the manner in which an embodiment is implemented.

DESCRIPTION OF DRAWINGS

Various example embodiments of the present invention will be further understood from the following detailed description, taken in conjunction with appended drawings, in which:

FIG. 1B discloses additional detail regarding example interfaces that may exist within apparatuses usable in accordance with various embodiments of the present invention.

FIG. 3A discloses an example of an active accumulation of device information by an attacking wireless communication device against other wireless communication devices which is a motivation for at least one embodiment of the present invention.

FIG. 3B discloses an example of a passive accumulation of device information by an attacking wireless communication device against other wireless communication devices which is a further motivation for at least one embodiment of the present invention.

FIG. 7B discloses a flowchart of a process detailing the example receive request process of FIG. 7A in accordance with at least one embodiment of the present invention.

FIG. 8B discloses a flowchart of a process detailing the example send connection request process of FIG. 8A in accordance with at least one embodiment of the present invention.

DESCRIPTION OF EXAMPLE EMBODIMENTS

Figure 1A:
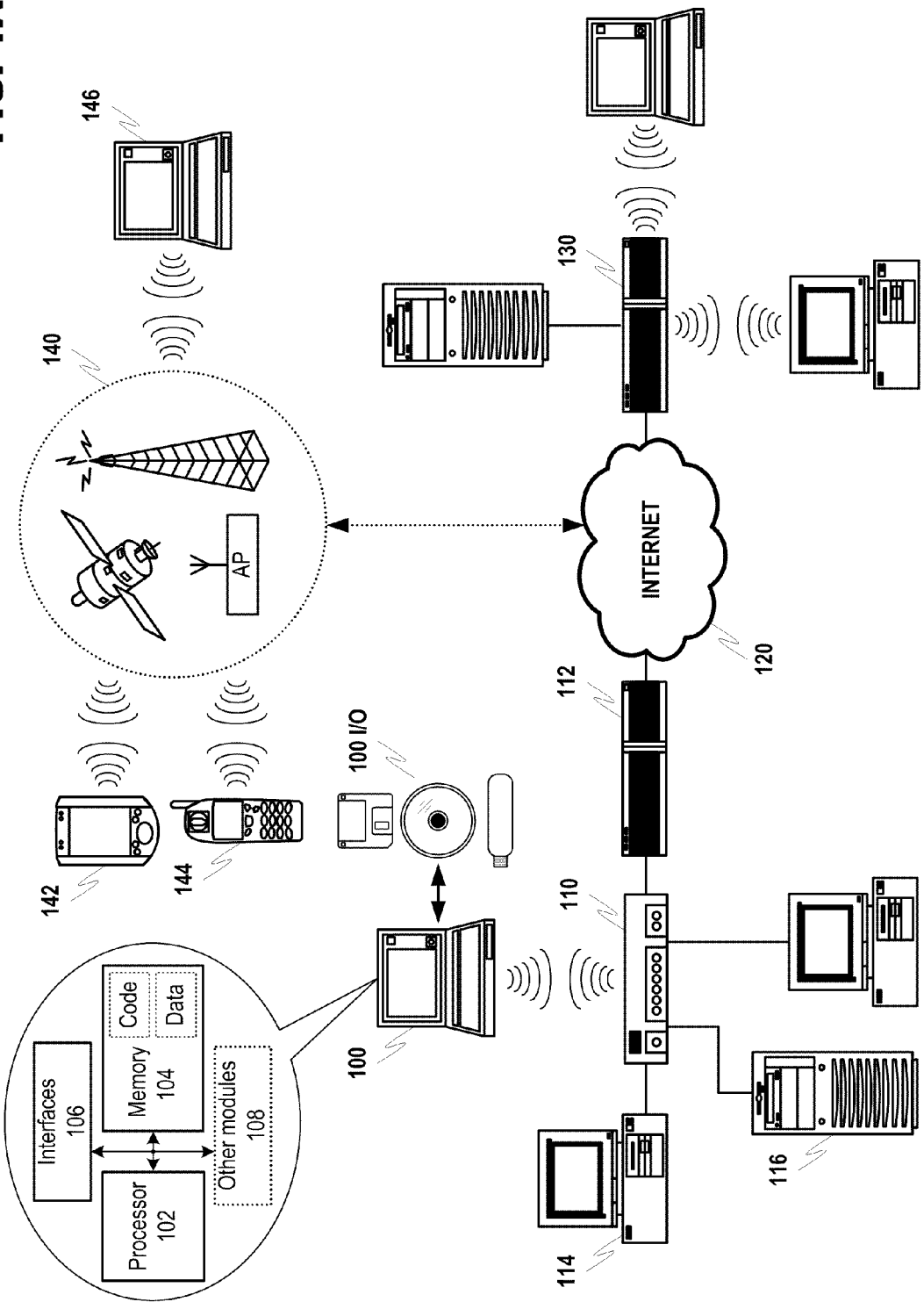
FIG. 1A discloses an example operational scenario including apparatuses that may be utilized in accordance with various embodiments of the present invention.

While the invention has been described below in terms of a multitude of example embodiments, various changes can be made therein without departing from the spirit and scope of the invention, as described in the appended claims.

I. Example System with which Embodiments of the Present Invention May be Implemented An example of a system that is usable for implementing various embodiments of the present invention is disclosed in FIG. 1A. The system comprises elements that may be included in, or omitted from, configurations depending, for example, on the requirements of a particular application, and therefore, is not intended to limit present invention in any manner.

Computing device 100 may be, for example, a laptop computer. Elements that represent basic example components comprising functional elements in computing device 100 are disclosed at 102-108. Processor 102 may include one or more devices configured to execute instructions. In at least one scenario, the execution of program code (e.g., groups of computer-executable instructions stored in a memory) by processor 102 may cause computing device 100 to perform processes including, for example, method steps that may result in data, events or other output activities. Processor 102 may be a dedicated (e.g., monolithic) microprocessor device, or may be part of a composite device such as an ASIC, gate array, multi-chip module (MCM), etc.

Processor 102 may be electronically coupled to other functional components in computing device 100 via a wired or wireless bus. For example, processor 102 may access memory 102 in order to obtain stored information (e.g., program code, data, etc.) for use during processing. Memory 104 may generally include removable or imbedded memories that operate in a static or dynamic mode. Further, memory 104 may include read only memories (ROM), random access memories (RAM), and rewritable memories such as Flash, EPROM, etc. Examples of removable storage media based on magnetic, electronic and/or optical technologies are shown at 100 I/O in FIG. 1, and may serve, for instance, as a data input/output means. Code may include any interpreted or compiled computer language including computer-executable instructions. The code and/or data may be used to create software modules such as operating systems, communication utilities, user interfaces, more specialized program modules, etc.

One or more interfaces 106 may also be coupled to various components in computing device 100. These interfaces may allow for inter-apparatus communication (e.g., a software or protocol interface), apparatus-to-apparatus communication (e.g., a wired or wireless communication interface) and even apparatus to user communication (e.g., a user interface). These interfaces allow components within computing device 100, other apparatuses and users to interact with computing device 100. Further, interfaces 106 may communicate machine-readable data, such as electronic, magnetic or optical signals embodied on a computer readable medium, or may translate the actions of users into activity that may be understood by computing device 100 (e.g., typing on a keyboard, speaking into the receiver of a cellular handset, touching an icon on a touch screen device, etc.) Interfaces 106 may further allow processor 102 and/or memory 104 to interact with other modules 108. For example, other modules 108 may comprise one or more components supporting more specialized functionality provided by computing device 100.

Computing device 100 may interact with other apparatuses via various networks as further shown in FIG. 1A. For example, hub 110 may provide wired and/or wireless support to devices such as computer 114 and server 116. Hub 110 may be further coupled to router 112 that allows devices on the local area network (LAN) to interact with devices on a wide area network (WAN, such as Internet 120). In such a scenario, another router 130 may transmit information to, and receive information from, router 112 so that devices on each LAN may communicate. Further, all of the components depicted in this example configuration are not necessary for implementation of the present invention. For example, in the LAN serviced by router 130 no additional hub is needed since this functionality may be supported by the router.

Further, interaction with remote devices may be supported by various providers of short and long range wireless communication 140. These providers may use, for example, long range terrestrial-based cellular systems and satellite communication, and/or short-range wireless access points in order to provide a wireless connection to Internet 120. For example, personal digital assistant (PDA) 142 and cellular handset 144 may communicate with computing device 100 via an Internet connection provided by a provider of wireless communication 140. Similar functionality may be included in devices, such as laptop computer 146, in the form of hardware and/or software resources configured to allow short and/or long range wireless communication.

Further detail regarding example interface component 106, shown with respect to computing device 100 in FIG. 1A, is now discussed with respect to FIG. 1B. Initially, interfaces such as disclosed at 106 are not limited to use only with computing device 100, which is utilized herein only for the sake of explanation. As a result, interface features may be implemented in any of the apparatuses that are disclosed in FIG. 1 (e.g., 142, 144, etc.) As previously set forth, interfaces 106 may include interfaces both for communicating data to computing apparatus 100 (e.g., as identified at 150) and other types of interfaces 170 including, for example, user interface 172. A representative group of apparatus-level interfaces is disclosed at 150. For example, multiradio controller 152 may manage the interoperation of long range wireless interfaces 154 (e.g., cellular voice and data networks), short-range wireless interfaces 156 (e.g., Bluetooth and WLAN networks), close-proximity wireless interfaces (e.g., for interactions where electronic, magnetic, electromagnetic and optical information scanners interpret machine-readable data), wired interfaces 160 (e.g., Ethernet), etc. The example interfaces shown in FIG. 1B have been presented only for the sake of explanation herein, and thus, are not intended to limit the various embodiments of the present invention to utilization of any particular interface. Embodiments of the present invention may also utilize interfaces that are not specifically identified in FIG. 1B.

Multiradio controller 152 may manage the operation of some or all of interfaces 154-160. For example, multiradio controller 152 may prevent interfaces that could interfere with each other from operating at the same time by allocating specific time periods during which each interface is permitted to operate. Further, multiradio controller 152 may be able to process environmental information, such as sensed interference in the operational environment, to select an interface that will be more resilient to the interference. These multiradio control scenarios are not meant to encompass an exhaustive list of possible control functionality, but are merely given as examples of how multiradio controller 152 may interact with interfaces 154-160 in FIG. 1B.

Figure 2:
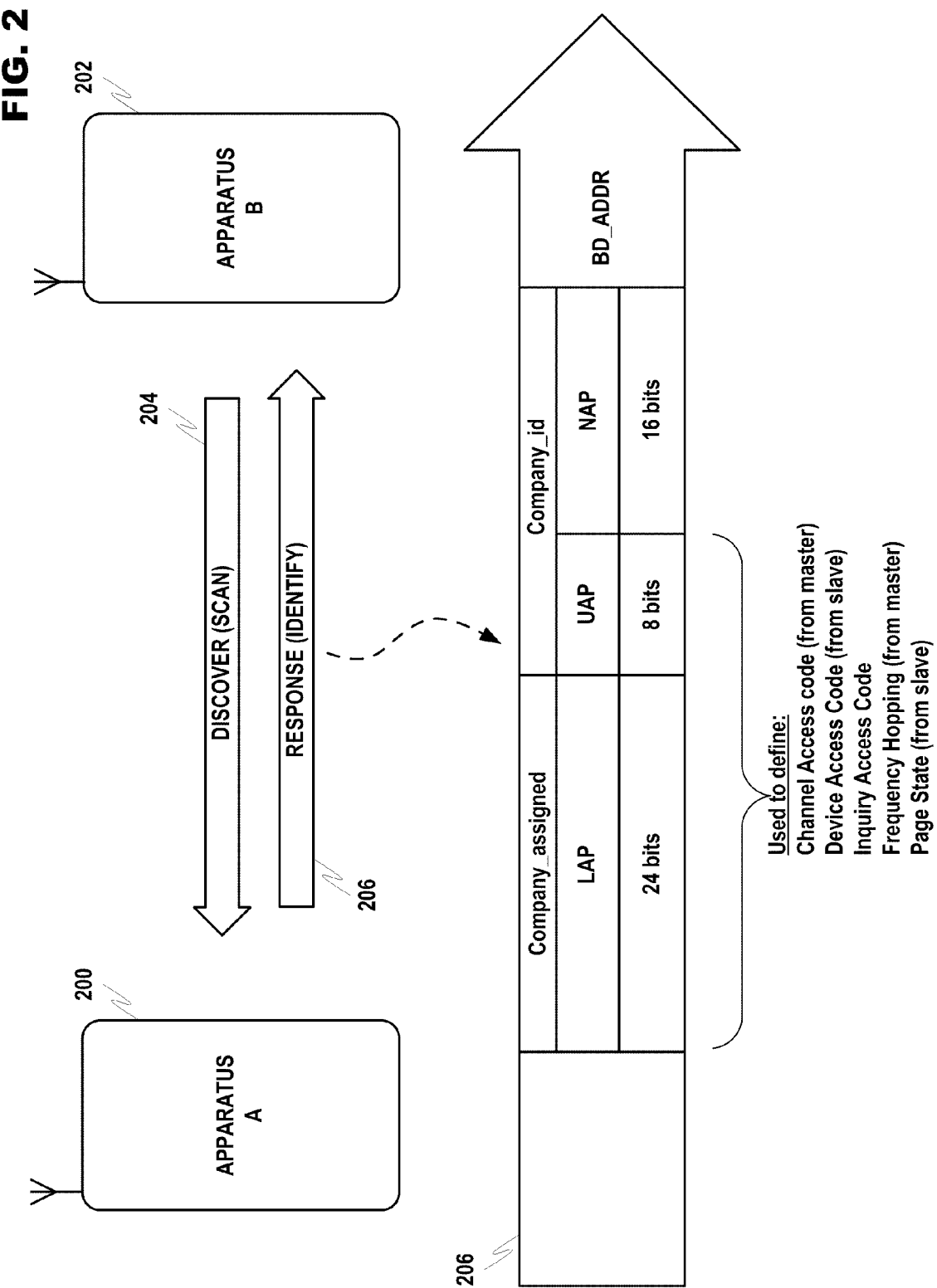
FIG. 2 discloses an exemplary communication between two wireless communication devices in accordance with at least one embodiment of the present invention.

II. Communication Between Wireless Communication Devices and the Vulnerabilities Therein Referring now to FIG. 2, an example scenario including two apparatuses engaged in wireless communication is disclosed. While only two wireless apparatuses are shown in FIG. 2, the various embodiments of the present invention are not limited as such. For instance, various wired and/or wireless communication protocols may be employed in any situation where identification information from an apparatus is being provided in response to a request from one or more other apparatuses. In cases where wireless communication is utilized, wireless protocols such as Bluetooth, Bluetooth LE (a scaled down version of Bluetooth that may better support low power devices), WLAN, wireless USB, or other similarly-operative protocols may be employed.

In example of FIG. 2 apparatus B 202 is attempting to establish a wireless link to apparatus A 200. Apparatus B 202 may initiate interaction by polling, or discovering, apparatus A 200 as shown at 204. These polls may, for example, advertise information for distribution to any neighboring apparatus, or may invite communication with specific apparatuses. In response, apparatus A 200 may transmit information derived from its Bluetooth address (BD_ADDR) shown at 206. This unique address is permanently assigned to the particular apparatus. Standard BD_ADDR formatting may be made up of a lower address part (LAP) comprising 24 bits, an upper address part (UAP) comprising 8 bits and a non-significant address part (NAP) comprising 16 bits. The LAP may correspond to a company assigned device identification for apparatus A 200, and the combined UAP and NAP may form the company ID. The information in the LAP and UAP may be utilized, alone or in combination, to derive communication information, such as the Bluetooth access codes used in wireless messages sent between the apparatuses.

For example, in situations where Bluetooth is utilized, access codes are included in the first part of each communication packet transmitted between the apparatuses. Some of the access codes used in Bluetooth are uniquely determined by the LAP contained in the BD_ADDR. There are at least three different distinct access codes: Channel Access Code (CAC), wherein the CAC is derived from the LAP of apparatus B 202 (master device), Device Access Code (DAC), wherein in the DAC is derived from the LAP of apparatus A 200 (slave device), and Inquiry Access Code (IAC), which occurs in two different forms and is derived from LAP values not related to any specific BD_ADDR.

The CAC and DAC may be used to track apparatus location, and accordingly, the current whereabouts of apparatus users may be determined. Furthermore, the entire BD_ADDR (LAP, UAP and NAP) may be included in Frequency Hop Synchronization (FHS) packets sent in order to coordinate inter-apparatus communication. More specifically, the frequency-hopping scheme in Bluetooth is determined by a hopping sequence that is calculated using different input parameters. To establish the connection state, the LAP and the four least significant bits in the UAP of apparatus B 202 may be used. For the page state, the LAP/UAP of the paged unit (e.g., apparatus A 200) is used. This may make it possible to obtain the LAP and four bits in UAP based on tracking the hopping scheme of communicating apparatuses. As a result, significant parts of the master device address could be revealed during the course of a connection.

FIG. 3A discloses an example of "attack" device 300 obtaining information from one or more apparatuses. Attack device 300 may initially poll for connection with other devices in the immediate area. Polling may occur over various wireless mediums such as Bluetooth, or other similar wireless mediums. If apparatus A 200 and apparatus B 202 are left in a receptive or discoverable mode, these devices may automatically respond and identify themselves to attack device 500. As a result, attack device 300 may store received identification information for use in tracking apparatus location and/or possibly for accessing their contents. For example, attack device 300 may operate near Internet access points (AP) or other highly-trafficked areas in which users would be more likely to have communication features activated in their apparatus. Such a situation would allow attack device 300 to prey on apparatuses operating in a permissive mode.

With respect to the example shown in FIG. 3B, attack device 300 does not have to actively transmit polling or inquiry messages in order to obtain identification information from other apparatuses. In this scenario, apparatus A 200 and apparatus B 202 are actively engaged in a wireless transaction. As previously described, the BD_ADDR of these apparatuses, or at least identifiable parts of these addresses in the form of access codes, will be exchanged during the interaction. However, signals in typical wireless communication would not travel exclusively between apparatus A 200 and apparatus B 202. Information intended for only these recipients may also be received by other apparatuses within communication range. Information that is not addressed to a particular recipient is usually ignored. However, attack device 300 may lurk in the background and accumulate this information without having to actively connect to another communication device. Acting in this secretive manner, attack device 300 may receive and store identification information that may be usable in a malicious manner to track the whereabouts of a particular apparatus, or alternatively, to gain access to private information.

Figure 3C:
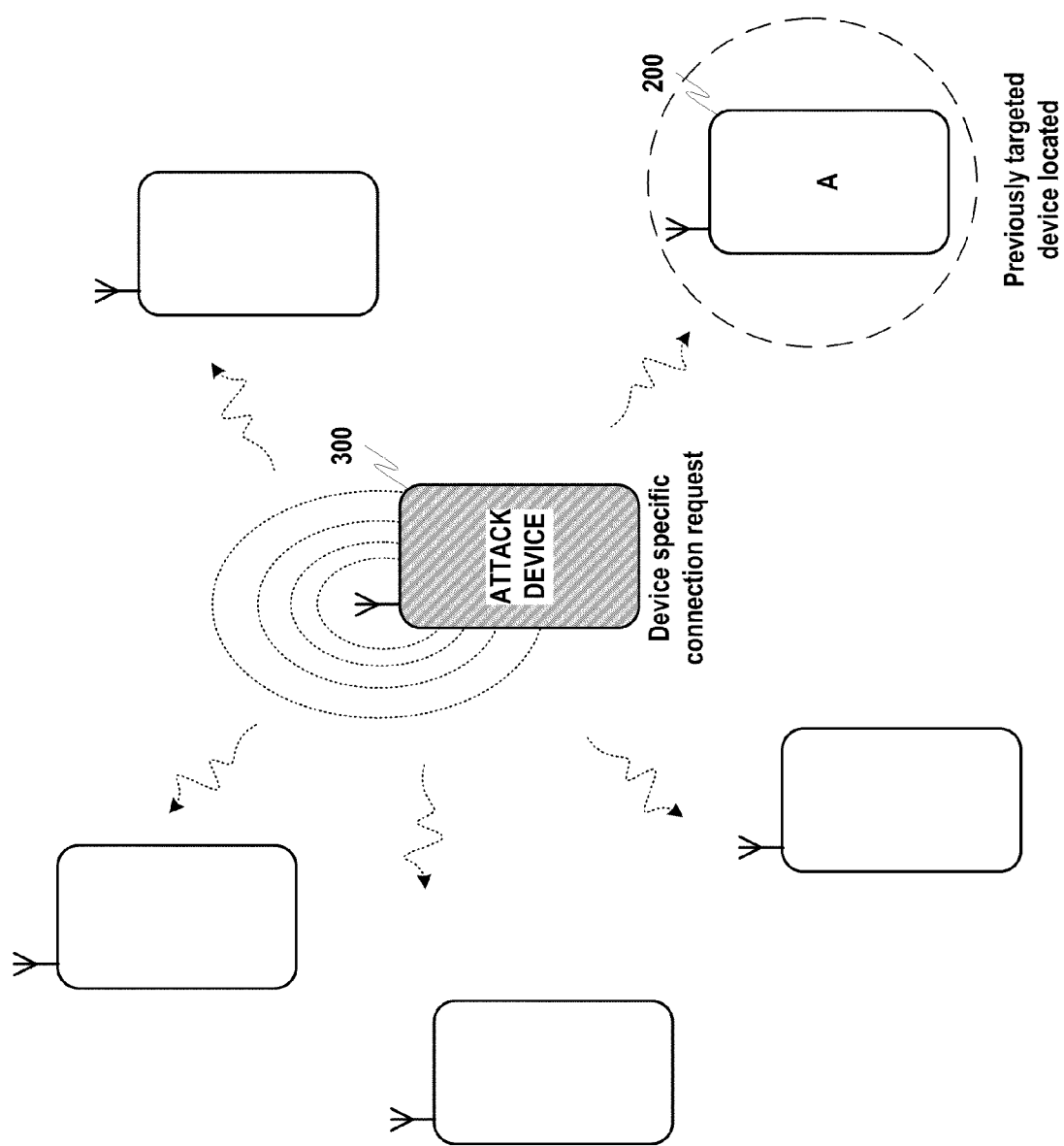
FIG. 3C discloses an example of an active location determination of a wireless communication device by an attacking wireless communication device which is a further motivation for at least one embodiment of the present invention.

An example of attack device 300 employing identification information to track the location of apparatus A 200 is disclosed in FIG. 3C. In this example, attack device 500 polls all apparatuses within communication range, wherein communication range is dependent on the wireless communication transport being employed. Polling may be utilized to determine if apparatus A 200 is in the area. In the case of Bluetooth, the range could include over a 300 ft. radius with proper power boosting. If apparatus A 200 responds to the poll, attack device 500 may identify apparatus A 200 as the desired target device, and notify the user of attack device 500 that a previously identified target has been located. This information may then be used to commit malicious or hostile acts against the user of apparatus A 200 or the apparatus itself.

Figure 4A:
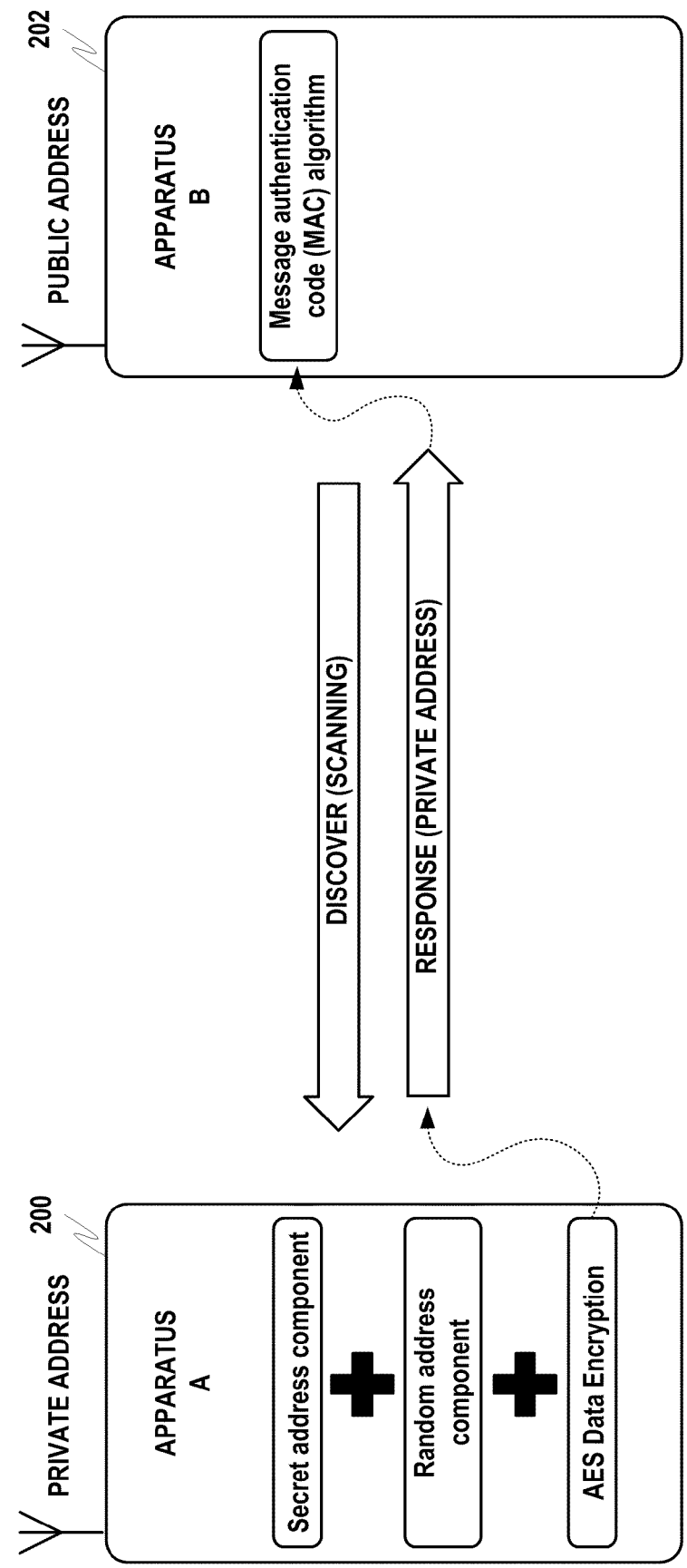
FIG. 4A discloses at least one embodiment of the present invention as it pertains to wireless communication devices that may communicate generally.

III. Masking Unique Apparatus Identity Through Temporary Pseudo-Random Addresses In accordance with at least one embodiment of the present invention, an example of generalized data exchanges between two apparatuses is shown in FIG. 4A. When employing Bluetooth-based wireless protocols (e.g., Standard Bluetooth, Bluetooth LE, etc.) discovery will identify at least two types of addresses: public and private. Public addresses are typically used in apparatuses where there is little or no concern regarding mobility-based privacy threats. Current examples of apparatuses that may use public addresses are access points (AP), fixed sensors, etc. For address entropy purposes, wherein address entropy is the degree of randomness in an address while still maintaining a predetermined address quality requirement for a WCD communicating over the particular wireless medium, public addresses may be generated in the same manner as private addresses, and in a similar fashion may remain unchanged. Public addresses may remain fixed over time so that clients may memorize and reconnect to these devices at a later time (e.g., in the case of a public AP providing wireless Internet service).

In FIG. 4A, apparatus B 202 is shown as having a public address, and may initiate a connection with apparatus A 200 that has a private address. It may be beneficial for Apparatus B 202 to use an unchanging public address so that other devices (such as apparatus A 200) may directly address AP 600 without having to discover all the wireless apparatuses in the area. This practice may help to conserve power in portable devices like apparatus A 200 by reducing the polling required to connect to known apparatuses. On the other hand, the private address being used by apparatus A 200 is using a private address conforms to addressing requirements of the particular wireless communication protocol (e.g., Bluetooth) being used, and therefore, appears as a normal identification when queried by other apparatuses such as apparatus B 202.

Apparatus A 200, operating under the previously indicated security concerns, may be able to alter its private address periodically, but not usually during a connection. Restricting private addresses to only being changeable when an apparatus is not connected to any other apparatus may be required to reduce baseband complexity and economize signaling. For extremely long-lived connections (for example, a user interface keypad linked wirelessly to a mobile phone) one option may be to automatically trigger the application level or operating system to periodically disable all wireless connections for a particular wireless communication protocol, re-randomize the private address, and then re-establish the previously terminated connections. However, this procedure may still constitute an apparatus entering an offline mode, though automatically and only temporarily.

In discussing address formation processes, it is assumed that an N-byte network address is formed to support wireless communication. Addresses may be altered based on at least two one-way functions: a cryptographic E( ) function and a radio-entropy-maintaining R( ) function. In view of the fact that many emerging wireless communication chipsets are beginning to include built in encryption features (e.g., Bluetooth LE chipsets may comprise built-in AES encryption), such built-in operations may be utilized for the cryptographic function, so that E( )=AES(key, data). For efficiency (e.g., pre-image-finding complexity), the actual function may be:

$$E(key,address)=\text{LOW\_}N/2\_\text{BITS}(\text{AES}(key,\text{LEFT\_}N/2\_\text{BITS}(address))|\text{LOW\_}N/2\_\text{BITS}(\text{AES}(key,\text{RIGHT\_}N/2\_\text{BITS}(address))) \quad (1)$$

In this instance, the key may also be considered to be a "not publicly advertised" address, or a secret address component. The constraint of the E( ) function is that the lowest 8 bits of both halves should result in a predetermined number (such as 153, which is the smallest decimal number which can be expressed as the sum of the cubes of its digits). Each half of the private address may be calculated separately, which may improve pre-image finding while still providing a resolution of $2^{16}$ for discovery (at the cost of requiring occasional key changes).

The radio-entropy-maintaining R( ) function may be defined as follows:

$$c=\text{XOR}(\text{LEFTMOST\_}NM1\_\text{BITS}(address),\text{RIGHTMOST\_}NM1\_\text{BITS}(address)) \quad (2)$$

where nm1=N−1, and $$R(address)=\text{IF}((nb>2)\text{AND}(nb<N-1))\text{THEN pass ELSE fail} \quad (3)$$

where nb=number of 1−bits in c

With respect to the above, the address is XORed with a copy of itself shifted by one in function (2). In function (3), if the number of either bit (1 or 0) is between 2 and N−1 it is accepted, otherwise it is rejected.

In the address generation example depicted in FIG. 4A apparatus A 200 decides on a random 16-byte secret address component (S), which it keeps for future reference. This address can alternatively be described as an identification (ID), as it is not usually used for routing, but primarily for verifying the actual identity of apparatus A 200 when a private address is employed. For each newly generated private address it will run two consecutive loops that, on average, may cycle 128 times (for the cryptographic function, the entropy function may add a few cycles) with a close-to-normal distribution for the variation. During each loop cycle, the apparatus randomly selects a N/2-bit random address proposal (P), and then checks whether P fulfills the R( ) function. If the P value does not make the function true, the R( ) function may adjust P to P' (e.g., a radio/protocol compatible version of P), or simply restart the loop from the beginning. If/when P satisfies the R( ) function, then K=E (S|P) is calculated. Utilizing the MOD( ) function, if K MOD 256=(a predetermined number) is true, then half of the private address has been calculated. If not, loop again with a new random P. As described above, this process is performed at least twice in the present example in order to yield two random Ps.

The results of the loops (first loop=P1 and second loop=P2) are then concatenated into an N-bit private address A. If AES encryption can be executed in approximately 10 μs, then full address generation is estimated at 2-3 ms considering that the AES encryption component is the dominant processing requirement. Moreover, as the calculation (with the exception of AES) is performed in primarily the system controller (e.g., processor 102), the overhead created by the address generation process should not overtax the overall control system of apparatus A 200. On the receiving end (e.g., apparatus B 202), a method authentication code (MAC) algorithm may be performed on the N-bit private address. This may, for example, employ AES encryption process steps applied in a reverse order to authenticate the content of the received address. In accordance with at least one embodiment of the present invention, the use of AES would be a natural choice since the source text for AES (the RAND) is always less than the input length of the AES block.

Figure 4B:
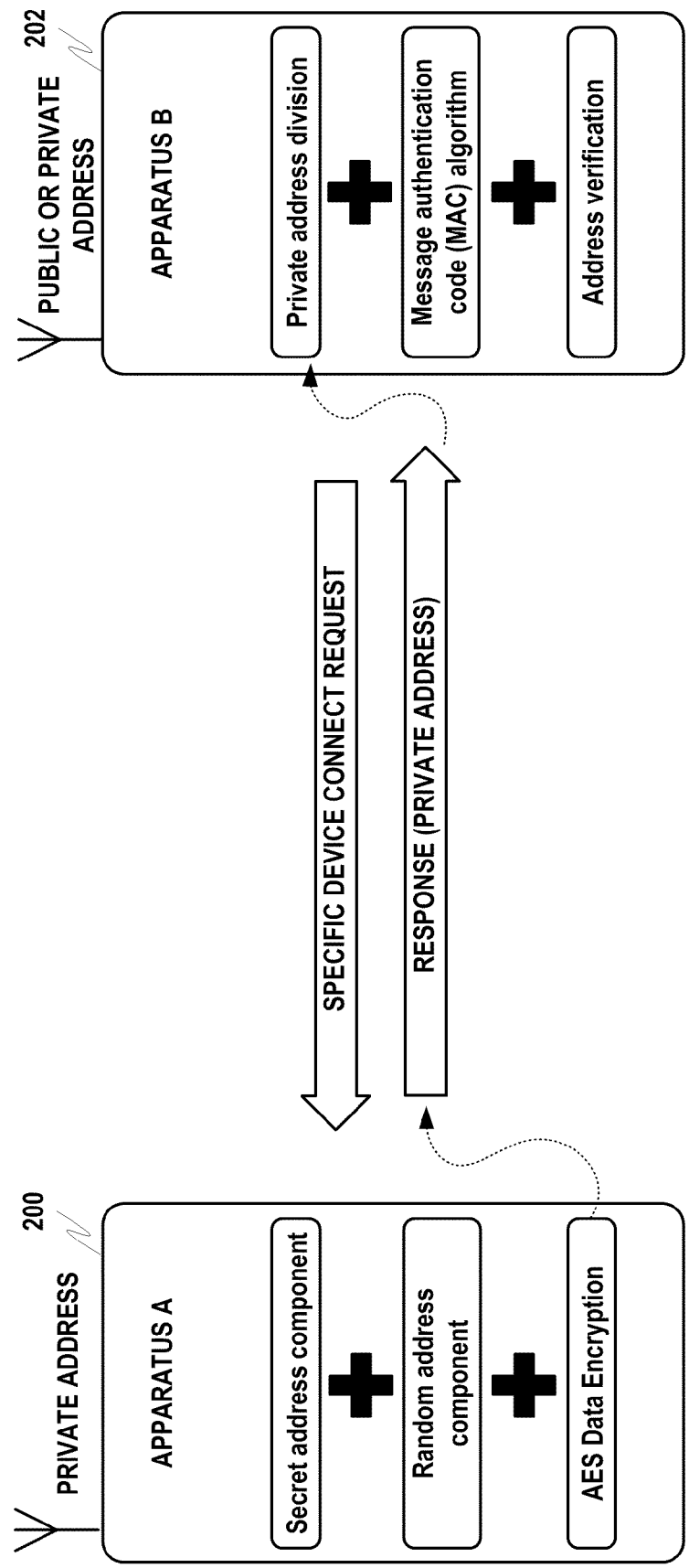
FIG. 4B discloses at least one embodiment of the present invention as it pertains to a wireless communication device searching for a specific target device.

A scenario wherein two devices are communicating wirelessly utilizing private addresses is disclosed in FIG. 4B. When apparatus B 202 desires to interact with a particular known apparatus (such as apparatus A 200), in a person-to-person (P2P) or possibly device-to-device Bluetooth LE mode, there are at least two possible ways of establishing the connection. In one example, upper layer control software in apparatus B 202 may scan the immediate area, whereby addresses of apparatuses proximate to apparatus B 202 may be returned. Apparatus B 202 may then select from amongst the returned addresses for further connection establishment.

Another option for apparatus B 202 is to connect directly to the desired apparatus, wherein the result of the connection attempt is either successful, resulting in a wireless link being formed, or unsuccessful (e.g., no reply is received from the desired apparatus). While discovery may, in principle, function similarly in both instances, in the latter case address resolution may be done completely in the baseband, which only requires that the secret address component of the target device is submitted as a connect parameter rather than the default "plaintext=random." This may be much simpler than the previous example where general discovery is performed. A general discovery process may require selection logic to be executed in the application layer, and in that instance, any resolution between random and private addresses must be done in that layer.

Secret address components may be distributed between trusted apparatuses prior to the discovery process. Secret address distribution may occur manually or by any out-of-band means between apparatuses that wish to communicate while remaining anonymous. Manual address component distribution may occur, for example, through wired/wireless communication, close-proximity interaction (e.g., near field communication), etc. The distribution of secret address components may also be combined with wireless pairing/key establishment protocols that may already be required for keying purposes. For example, dedicated versions of keying protocols may be constructed and employed for exchanging secret addresses rather than shared link keys for apparatuses that don't need link security, but still want to use the anonymity feature.

When apparatus B 202 wishes to connect to a known peer using private addresses, but for which the secret address is known (e.g. apparatus A 200), the connecting apparatus first determines all addresses in the neighborhood. For any received private address, apparatus B 202 may divide the address in two halves, and based on the example in FIG. 4B, apply one or more AES encryption steps in accordance with a message authentication code (MAC) algorithm over the intended target apparatus' secret address component and the halves of the seen private address. If the last byte of the result matches the predetermined number for both operations, the connecting device can be fairly certain that the intended device has been found. If a particular security context is required for the link, apparatus B 202 will repeat the process for the source address so that the apparatuses can resolve any material needed for security establishment.

The duration of discovery will be close to one AES encryption per address pair for "wrong" addresses (the discovery for an address can be aborted after the test for the first part of the private address fails), and two for the correct address. If a general scan is performed of all apparatuses in the area, this procedure has to be done for all pairs of known secret addresses (or more precisely, for all addresses involved in a transaction) and received private addresses, which may be a fairly substantial task for large sets of known or received addresses. However, at least part of this process may be performed offline, and applications that need not resolve identity can bypass the identification procedure and connect to apparatuses based on device class or other similar information. In addition, most non-mobile devices that need to be identified by type (e.g., access points) use public, non-changing addresses which can be connected to directly.

There are several ways to resolve whether a scanned address is public or private. The R( ) function may be augmented to require that one specific bit of the visible address is "1" or "0" depending on the address type embedding the information in the address itself. It is also possible for ID_RSP PDU, the message that gives the address to the inquiring party, to contain address type information as a specific control bit in the PDU. The private address may also be used as an index to an external (out-of-band) query to resolve the issue. Bluetooth LE possibly includes the notion of a "service discovery/resolver" server that would be hosted on the Internet. Although the primary task of such a server is to resolve service/profile issues, it may also be able to resolve addresses, and among other things, determine whether an address is public or private.

In an alternative configuration, the amount of address resolution may be reduced in order to save on device resources and to increase the speed of the process. Private addresses in this embodiment may be constructed in the following manner: One half of the private address (H1) is random and fed through the R( ) function (it is assumed that enough address entropy can be achieved by modifying only half of the address), and the other half of the private address is constructed as a part of the result of the operation.

$$H2=E(\text{secret address},0|H1) \quad (4)$$

H1 and H2 are then combined to form a private address. No trial and error is required computing the address, and the resolution of the address is N/2, where N is the bit length of the address as determined by the wireless communication protocol. A limitation in this embodiment is that the entropy-related R( ) function cannot be allowed operate over the entire address, which may be significant for short addresses (e.g., 30 bits or less). This restriction may be avoided if R( ) is self-correcting, can be applied after encryption, and the apparatus can apply the self-correcting R( ) function prior to testing a received address. The same result may also be realized by looping R( )) over with different inputs until a satisfactory result is achieved, which may be advantageous in that address generation may be more deterministic in time. Overall, the solutions may have fairly similar properties, although the mechanisms differ slightly.

IV. Bluetooth LE Integration

As a security feature in Bluetooth LE, the integration requirements of the present invention in the baseband are slight. Most activities may be handled in the application layer. There is already an AES hardware block interface designed for the ULIF (upper layer interface) that may be utilized for address generation, which may follow the algorithms defined above.

Discovery may employ one of the address-type resolving methods described above, the choice of which may include an interpreter at the application layer, however the ID and ID_RSP PDU may then require an extra bit. At least two choices exist for connection, and may be implemented in parallel. A low overhead option is to scan, resolve the address type, and in the case of private addresses resolve the identity behind the address if the connection is to be established. This logic may be completely deployed within the application layer, and even in the case of private addresses, connection establishment may proceed by simply utilizing the private address for which the identity has been determined. Providing secret addresses to the baseband of apparatuses may expedite direct connection, wherein algorithms such as described above may be performed when attempting to connect directly to a previously identified apparatus.

V. Multiple Apparatus Identities

The above implementations are based upon the premise that apparatuses have a single, fixed identity and the ability to create a private address, unrelated to the fixed identity, for use communicating with other apparatuses. However, the ability to create addresses that are not tied to the unique apparatus identity, in accordance with the various embodiments of the present invention, may allow for the creation of multiple private addresses for use when interacting with other apparatuses. In particular, separating the fixed apparatus identity from address creation removes any limitation on the number of identities and corresponding addresses in an apparatus.

Figure 5:
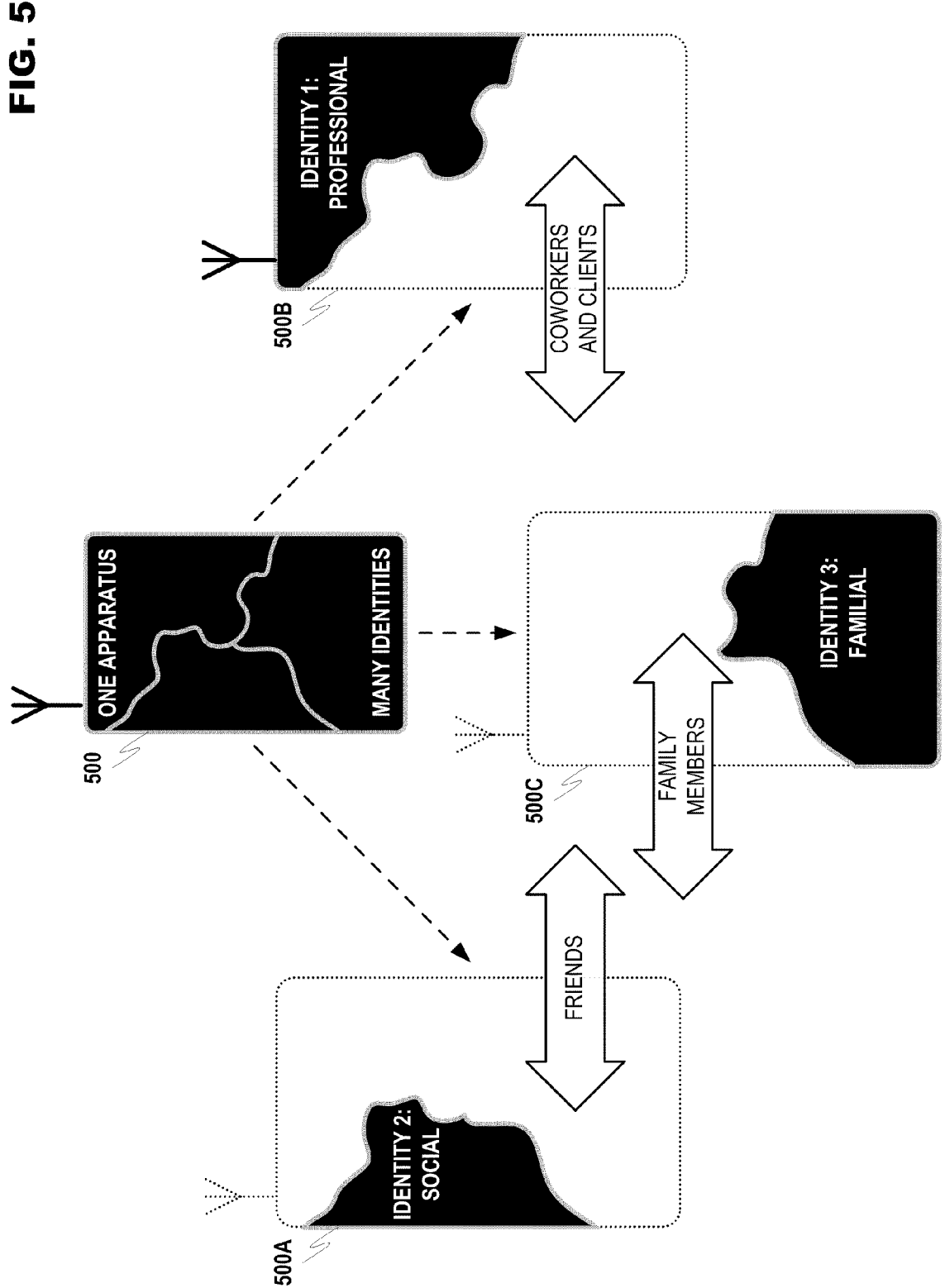
FIG. 5 discloses an example scenario wherein an apparatus has a plurality of public identities in accordance with at least one embodiment of the present invention.

Now referring to FIG. 5, an example of a single apparatus 500 having multiple identities is disclosed. Apparatus 500 is shown with three identities 500A-550C. Identity 500A may be a "social" identity. Identities intended for particular groups or operational environments may imply that various characteristics related to the identity are appropriate for one situation, or may not be appropriate for another. For example, the social identity may appear to another user (e.g., may be displayed on a friend's apparatus) using a nickname that is jovial, silly, humorous, etc. Regardless, this identity may not be appropriate for use in a business or family environment. Moreover, users may desire to keep an apparatus identity utilized in social settings (e.g., with friends) apart from professional contacts to maintain formalities in the office, with clients, etc.

Having another identity allows apparatuses having unique, fixed identifiers to operate almost like a totally different device. For example, professional identity 500B may allow an apparatus to be identifiable only by the devices of other business associates, by client devices, etc. Moreover, a user having an apparatus that recognizes social identity 500A may be prevented from recognizing the same apparatus when acting in a business setting by limiting the identities that are concurrently active in an apparatus. There may be instances when is it permissible to have multiple active identities, such as having professional identity 500B and familial identity 500C enabled at the same time. In such a situation no detriment may be realized if a business associate is also a relative, and thus, observes the apparatus in terms of two different identities.

While the benefits of having multiple identities is apparent, the method by which such identities are advertised is not quite as clear. In particular, when the automatic link between identity and the fixed address disappears, discovery becomes essentially about identity and not about addresses, and thus, apparatuses should ideally be able to support multiple identities or aliases. Logically, the whole situation may seem like a non-issue. Apparatuses with multiple identities should be able to broadcast some or all of the identities via wireless communication. However, implementation may be troublesome because typical hardware configurations are not equipped for such operation. Advertisement operations are preferably performed as low in the protocol stack (e.g., as close to the hardware level) as possible, avoiding unnecessary activation of firmware processing cores for extended periods of time during repetitive advertising. Along these lines, a straight-forward way to implement this in global/single identity scenarios is to have a buffer for retaining an advertisement message that is sent out periodically. While such systems appear simple and efficient on the surface, consider that several identities need to be advertised in a round-robin fashion. Given the incentive to avoid upper layer usage, a separate buffer would be needed for each advertised identity, with logic to broadcast them in order as a circular buffer.

The above identity broadcast scenario, while not overly complex, is significantly more difficult to implement than a typical apparatus communication configuration. Moreover, message reception and link establishment (e.g., reacting to connection attempts made by other apparatuses) also increases in complexity since connection requests may now be targeted to one of several advertised identities. Resolving connection requests no longer comprises comparison to a single identity contained in the sole buffer. In addition, changes that require the redesign of communication hardware are much harder issues to tackle in the context of extending a standard, as opposed to mechanisms that could be implemented using existing hardware configurations, and thus, may necessitate only firmware (e.g., software) modifications.

In view of the above difficulties, various embodiments of the present invention may implement multi-identity privacy-maintaining address advertising and resolving such that the hardware implications will be minimized (e.g., no or possibly minimal changes from basic hardware configurations for supporting wireless communication protocols like Bluetooth LE). Solutions for advertising identities may still rely upon time-division wireless broadcasting, but since functionality that allows these advertisements to be changed now exists in many wireless communication protocols (e.g., even in basic architectures such as set forth in Bluetooth LE) apparatuses may now vary addresses with "higher frequency" based on round-robin order or in another fashion (e.g. weighted).

In avoiding hardware modification, at least one embodiment of the present invention will require that multiple addresses being advertised from the same apparatus (e.g., corresponding to different apparatus identities) have the same initial 24-bits, but a variation in the latter 24 in accordance with the different identities advertised. To avoid confusion, the first "fixed" part is also random, but may change at a much lower frequency that time intervals such as defined by Bluetooth LE. For example, random address components may be triggered to change on active connection termination, device boot, periodically (e.g., 5 minute intervals), etc.

As processing resources, in accordance with various embodiments of the present invention, may be called upon to update the address being broadcast more frequently, increased energy consumption may be seen in overall apparatus communication operations when compared to situations where the address being advertised rarely changes. In the latter instance, processing resources in the apparatus can, in principle, be shut down and re-activated only on the occurrence of incoming connections. However, any negative impact realized from increased processing load may be deemed acceptable since embodiments of the present invention may be more appropriate for implementation in apparatuses that are user representative, such as mobile communicators, phones, etc. Such apparatuses may have more lenient resource restrictions, as opposed to simple devices like sensors, headsets, etc., which would be less likely to have a need for advertising multiple identities. In that sense, the apparatuses with the most critical energy constraints would not be the typical targets for implementing the various embodiments of the present invention.

Figure 6A:
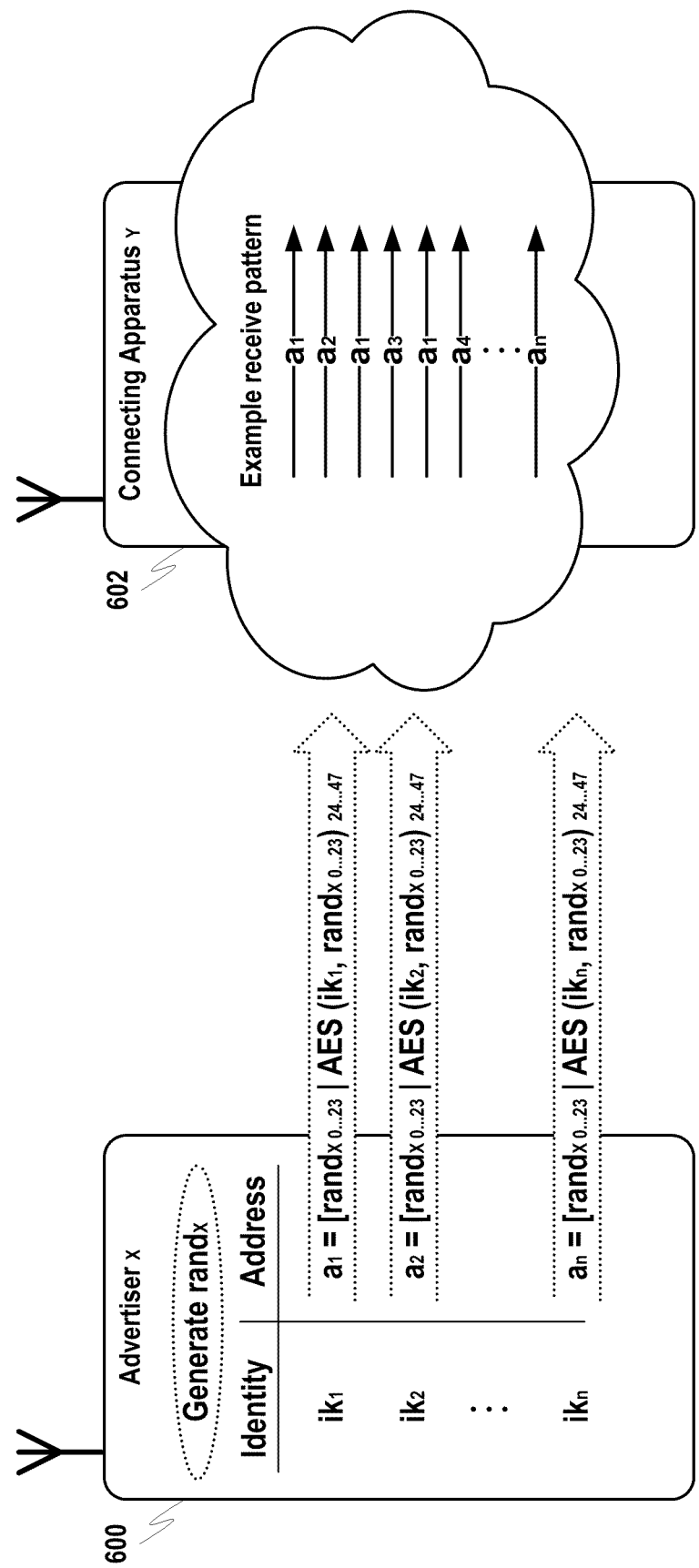
FIG. 6A discloses an example of broadcast address formulation in accordance with at least one embodiment of the present invention FIG. 6B discloses an example of a receiving apparatus responding to a broadcast address in accordance with at least one example embodiment of the present invention.

Now referring to FIG. 6A, an example implementation of the present invention is disclosed. When connecting apparatus 602 scans the neighborhood, either browsing or looking for a specific device, a sequence or set of addresses belonging to the multi-identity apparatus 600 can be seen as belonging together based on the first 24 bits of an address ($addr_{0...23}$). Connecting apparatus 602 will examine all addresses in a sequence with the same initial address portion in looking for a match with an identity (e.g., $ik_1 \ldots ik_n$) known to it, based on applying the keyed one-way function on the initial part, with an identity key shared between connecting apparatus 602 and advertiser 600, and comparing the result to the latter half of the address.

Figure 6B:
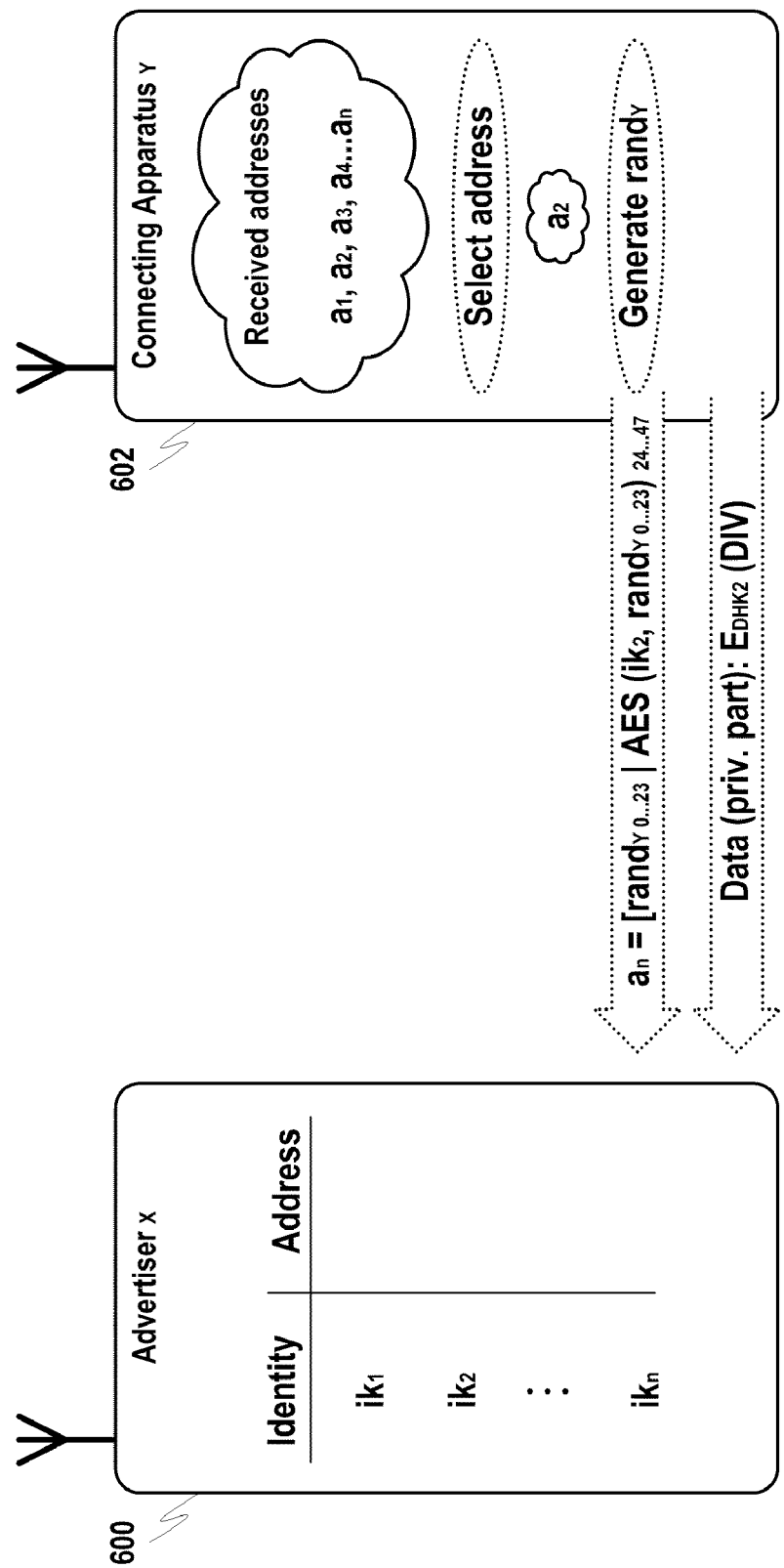

If a match is found, connecting apparatus 602 will attempt to connect to multi-identity apparatus 600 using the most recently advertised address from this set as shown in FIG. 6B, which is not necessarily the address version matching the intended identity. This connection method is based on the assumption that no hardware upgrade has been implemented in multi-identity apparatus 600, and thus, the hardware of that apparatus will only recognize connections requested based on the latest advertised address. This would probably be the case regardless for automatic connections since connecting apparatus 602 sees the address, resolves it and connects within one "timeslot", while delay-inducing human assisted selection or more-complex logic for determining whether or not to connect would, in practice, overflow the tens-of-milliseconds time window when more than one identity is active in advertiser 600. If manual selection is enabled, an apparatus could wait for the next address broadcast from the apparatus corresponding to the desired address (e.g., identified based on the first part of the address), but this would cause a delay that can be avoided in accordance with various embodiments of the present invention.

As the response can be disconnected in time from advertisement, encrypted security context diversifier (such as in Bluetooth LE) issues should be considered. The keys by which a diversifier is protected are identity specific. Since encryption is not integrity-protected by default, there is no way for advertiser 600 to resolve (e.g., without completing set-up of the entire session) to which of the advertised identities connecting apparatus 602 intends to connect. However, the address of connecting apparatus 602, which by default is completely random (e.g., in the case of Bluetooth LE) for use in seeding the diversification encryption (e.g., as a nonce), may be utilized since a 48-bit nonce is unnecessarily large compared to the 24-bit resolution of private addresses in general. Thus, there is no serious privacy implication for the apparatuses if the address of connecting apparatus 602 is constructed by appending 24 bits of new randomness to the tail part of an advertised identity that connecting apparatus 602 recognizes as desirable for connection. The session set-up in the receiving end will accept the connection in the hardware layer (e.g., since it is addressed to the last advertised address) that passes the PDU information for resolving the local identity that is intended based on the latter 24 bits of connecting apparatus 602's address, with the rest of the process being similar to a single-identity scenario, wherein the diversifier hiding is decrypted with the identity key ($ik_2$ in the example). In actuality there is a key family where $ik_2$ and a so called diversifier hiding key DHK2 are keys in the same family, but for the purposes of this embodiment these keys can be considered to be the same. The confidentiality key corresponding to the identity that is connected to is then located based on the identity and the decrypted diversifier. An encrypted and integrity-protected session may then be further established based on the resolved confidentiality key.

In specific regard to Bluetooth LE implementation, it may be possible to extend current Bluetooth LE privacy solutions to systems that support multiple identities with minimal hardware change, and only minor updates to the firmware. The frequency of advertisements in Bluetooth LE may range from tens of milliseconds upwards. For example, when using schemes in accordance with the various embodiments of the present invention, tens of different identities can be advertised every second by a single Bluetooth LE apparatus. Theoretically, the level of privacy achieved by various embodiments of the present invention may have some vulnerability to attack. More specifically, attackers having suitable prior information could possibly connect earlier captured information to identities and/or apparatuses by monitoring advertisements being broadcast that correspond to different identities within the same apparatus. Of course, such an attack would require attackers to obtain the prior information, which presents its own challenges.

A possible side-effect of having multiple parallel identities in use is that identity and confidentiality roots may, for some identities, be shared amongst several apparatuses (since any apparatus may already maintain and advertise its own identity in parallel). In practice this implies a situation where several apparatuses not only know, but also advertise their presence using the same identity. Some of these group identities might even be publicly known if they, for example, relate to some popular group application (e.g., social peer-to-peer applications might use the identity mechanism as a discovery accelerator). However, because every new identity may, in principle, make discovery slower, identities should be assigned with care. The identity mechanism suggested by various embodiments of the present invention is not a general replacement for a good service discovery mechanism. Also, for apparatuses having resource constraints, this concept may add storage requirements for additional root keys, as opposed to the default configuration which may only require one root key per apparatus.

Embodiments of the present invention may also indirectly resolve Bluetooth LE address privacy issues with regard to revocation. In the single-identity situations the only way to exclude a peer from the "privacy group" may be to construct a completely new identity and then reinitiate pairing for the apparatuses that are allowed to stay in the group. The embodiments of the present invention disclosed herein do not address the revocation issue directly, but because an apparatus is allowed to have many parallel identities, it allows the possibility of grouping peer apparatuses into smaller groups from the perspective of advertising devices. The revocation then only has to be done with respect to the smaller group (for the identity of the unwanted pairing).

Figure 7A:
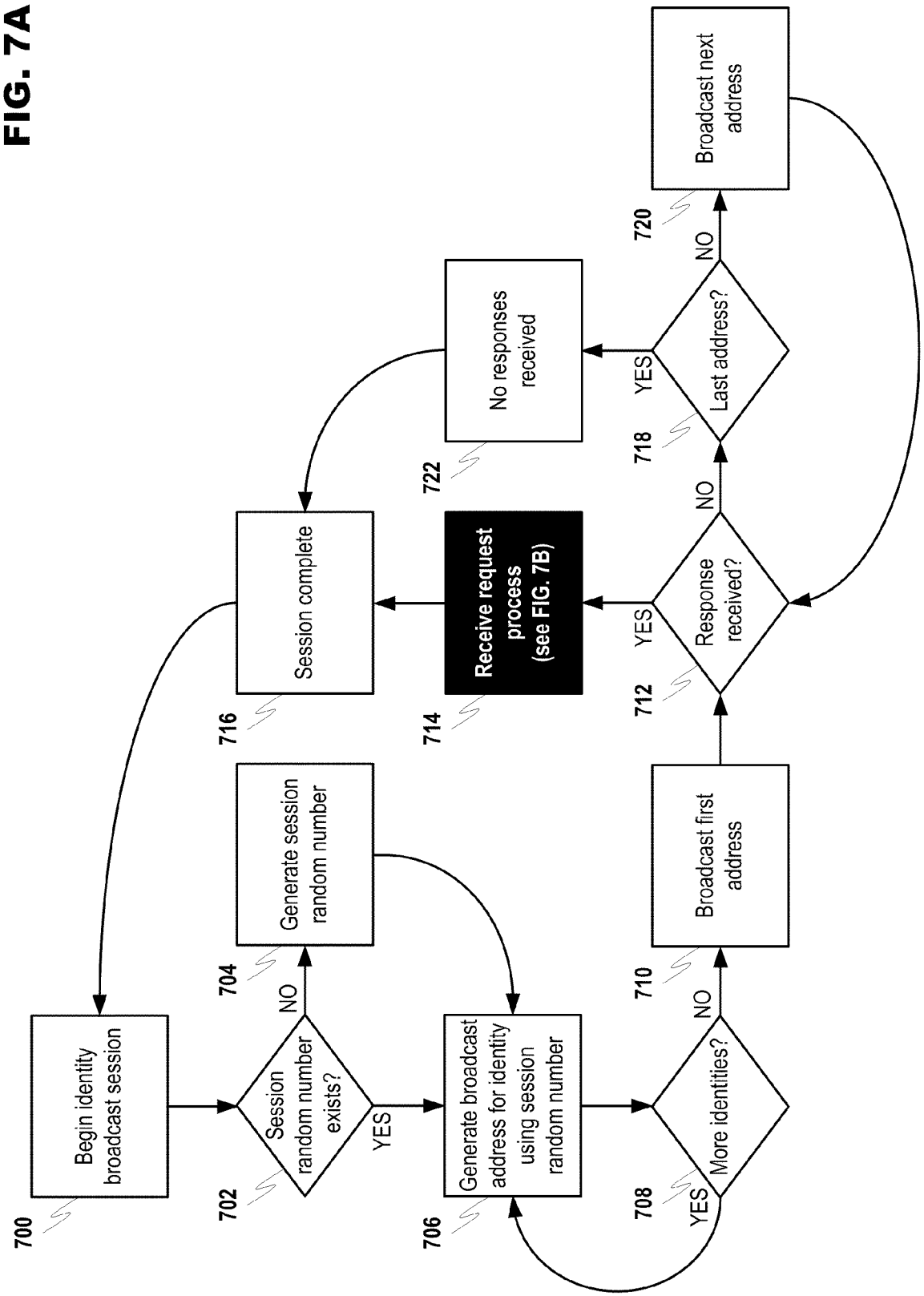
FIG. 7A discloses a flowchart of an example process for encoding and broadcasting addresses in accordance with at least one embodiment of the present invention.

A flowchart for an example broadcast address generation process, in accordance with at least one example embodiment of the present invention, is disclosed in FIG. 7A. An apparatus begin broadcasting identities (e.g., an identity broadcast session) in step 700. Step 700 may be triggered by such events occurring in applications executing within an apparatus, through user activation of communication features in the apparatus, through sensing signal activity on an initialization channel, etc. A determination may then be made as to whether a random number needs to be generated in order to support the identity broadcast session in step 702. A session random number may be generated based on activities such as connection establishment and/or termination, application events, user configuration, periodically, etc. If a session random number is needed, it is generated in step 704. Regardless, of the determination in step 702, the process will eventually proceed to step 706 where a broadcast address may be created for each identity to be advertised using the session random number. An apparatus with multiple identities may broadcast one or more of the multiple addresses in a session based on the particular situation. For example, identities may be omitted if they are not appropriate for the operating environment.

A broadcast address may be created for each identity to be advertised by using each identity and the random number as inputs to an encoding function. The resulting encoded value may then, in accordance with at least one example embodiment of the present invention, be concatenated with the random number to form a broadcast address. This process is performed for each identity to be advertised in step 708. The first address may then be broadcasted in step 710, which is followed by a determination in step 712 as to whether a response is received to the broadcast address. If a response is received then the advertising apparatus may engage in a receive request process in step 714. A series of process steps that may make up example receive request process 714 are disclosed with respect to FIG. 7B. The session may then be completed in step 716, at which time the process may return to step 700 to await the next broadcast session.

Moving momentarily to FIG. 7B, example process steps that may make up receive request process 714 are now disclosed. In step 750 a request to establish a wireless link may be received from another apparatus. The receiving apparatus may decode the request message in step 752 in order to determine whether an identity corresponding to the requesting apparatus is contained in the request message. If the request message contains an identity, and the identity is recognized in step 754 (e.g., the identity was previously encountered and is known to be safe, desirable, etc.), then in step 756 a wireless link may be established with the requesting apparatus. Otherwise, the process may proceed from step 754 to step 758 wherein the request message from the unknown apparatus is ignored. In either instance, the process may culminate in step 760.

Returning to FIG. 7A, if in step 712 no response is received to the address that was broadcast in step 710, the process may move to step 718 where a determination is made as to whether there are still addresses awaiting broadcast. If further addresses remain (e.g., addresses created in steps 706 and 708 have not yet been broadcasted), then in step 720 the next address may be broadcast. It is important to note that the order in which addresses are broadcast may be determined in the apparatus based on various criteria such as sensed operational environment, apparatuses sensed in proximity to an advertising device, current apparatus condition, current time of day, current day of week, manually set apparatus operational mode, etc. For example, an address that is determined to be more important (e.g., higher priority) than other addresses may be transmitted more frequently than the other advertised addresses. Resulting broadcast orders for addresses may not be totally symmetric. An example of such a pattern may be observed in the received pattern of broadcast addresses shown for connecting apparatus 602 in FIG. 6A.

The process may continue to loop between steps 712 and 720 until a response is received in the advertising apparatus or no further apparatuses are left to broadcast per step 718. If all addresses have been advertised without receiving a response, the process may proceed to step 722 where activities may be triggered that, for example, notify applications in the apparatus, a user, etc. that no responses were received to the addresses that were broadcast. The process may then return to step 700 to await the next activity that triggers a broadcast session.

Figure 8A:
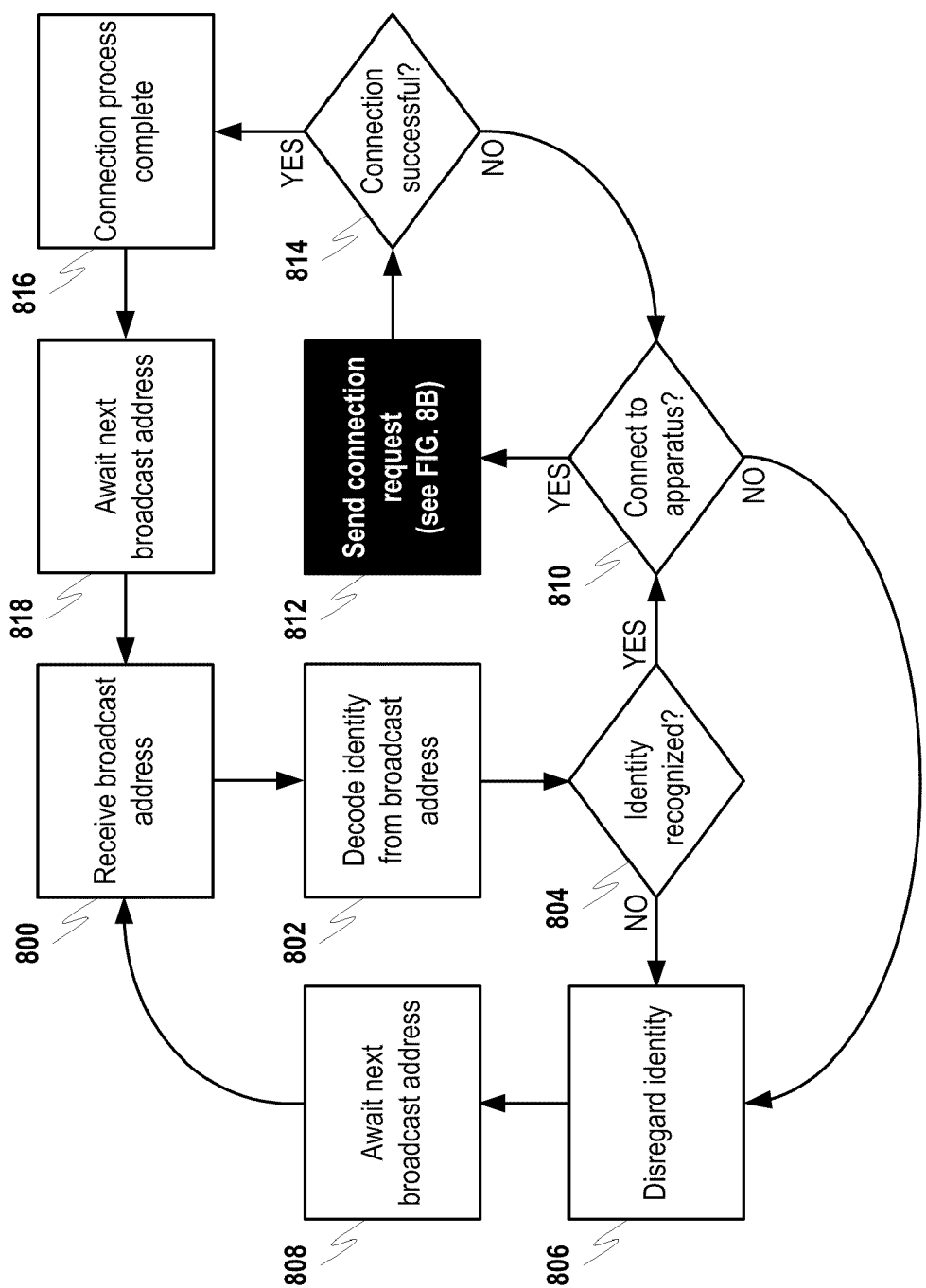
FIG. 8A discloses a flowchart of an example process for receiving, decoding and possibly responding to broadcast addresses in accordance with at least one embodiment of the present invention.

In accordance with at least one example embodiment of the present invention, a flowchart for a process that may execute in a requesting apparatus is disclosed in FIG. 8A. In step 800 an apparatus may receive messages including broadcast address information. The contents of these received messages may be decoded in step 802. In various embodiments of the present invention, decoding the received broadcast apparatus may yield at least an apparatus identity. The apparatus identity may then be compared to known identities in step 804 in determine whether the identity is recognized. An identity may be recognized if, for example, the identity was utilized when the advertising apparatus was previously paired with the requesting device using Bluetooth or a similarly functioning wireless communication transport. If the identity is not recognized by the requesting apparatus in step 804, then in step 806 the identity may be disregarded and the process may await receipt of the next broadcast address in step 808.

If the identity is recognized in step 804, the process may proceed to step 810 where a determination is made whether a connection should be attempted with the identified apparatus. If no connection is desired, the identity may be discarded in step 806. Otherwise, the process may proceed to step 812 where a connection request is sent to the advertising apparatus.

An example process for sending a connection request to a broadcasting apparatus is disclosed in flowchart of FIG. 8B. The apparatus that receives the broadcast address may send a request message containing information corresponding to the last received broadcast from the apparatus having the desired identity. As previously discussed, the last received address does not necessarily correspond to the identity that was recognized in step 804. The last received address is simply the address that would be expected by the advertising device with respect to connection request messages. The process of FIG. 8B helps to facilitate formation of such request messages. For example, in step 850 the requesting apparatus may determine a "common" apparatus portion from the received broadcast address that provided a recognized identity. The common apparatus portion may be a component of the decoded address that is common to all addresses broadcast by a particular apparatus. The last received broadcast may then be decoded in step 852 to determine if it has the same common portion, and therefore came from the same broadcasting apparatus, as the apparatus corresponding to the recognized identity. If in step 856 the common apparatus portion in the last received address is not the same as the common apparatus portion associated with the desired identity, then in step 856 the address may be discarded and the process may return to step 852 to check the next address. If the common address portions match in step 854, then in step 858 a request message may be composed using the information from the received address. The process may then culminate in step 860 and return to the process flow of FIG. 8A.

If it is determined that connection to the advertising apparatus is successfully established in step 814, then the connection process may be deemed complete in step 816 and the requesting apparatus may await receipt of the next broadcast address in step 818. Otherwise, the process may return to step 810 to determine whether connection to the advertising apparatus is still desired. In step 810, the requesting apparatus may decide to reattempt a connection in step 812, or may abandon further connection attempts if, for example, a time threshold or number of connection attempts has been exceeded. In such an instance, a requesting apparatus may decide to discard the entity in step 806 and await the receipt of further broadcast apparatuses in step 808.

The various embodiments of the present invention are not limited only to the examples disclosed above, and may encompass other configurations or implementations.

For example, embodiments of the present invention may encompass apparatuses comprising means for associating a plurality of identities with an apparatus, means for encoding each of the plurality of identities into one or more addresses, means for broadcasting each of the addresses from the apparatus in a separate wireless message, and means for listening in the apparatus for a wireless response message including information related to the address that was most recently broadcast.

At least one other example embodiment of the present invention may encompass apparatuses comprising means for receiving a wireless message comprising at least an address in an apparatus, means for decoding the address in the apparatus in order to obtain an identity corresponding to the received address, means for, when the identity is known to the apparatus, determining whether to request wireless communication link establishment with an apparatus that broadcast the wireless message, and means for, if a determination is made to request wireless communication link establishment, determining the last address that was received from the apparatus that broadcast the wireless message, encoding the last address that was received from the apparatus that broadcast the wireless message into a wireless request message, and transmitting the wireless request message.

At least one other example embodiment of the present invention may include electronic signals that cause apparatuses to associate a plurality of identities with an apparatus, encode each of the plurality of identities into one or more addresses, broadcast each of the addresses from the apparatus in a separate wireless message, and listen in the apparatus for a wireless response message including information related to the address that was most recently broadcast.

At least one other example embodiment of the present invention may include electronic signals that cause apparatuses to receive a wireless message comprising at least an address in an apparatus, decode the address in the apparatus in order to obtain an identity corresponding to the received address, when the identity is known to the apparatus, determine whether to request wireless communication link establishment with an apparatus that broadcast the wireless message, and if a determination is made to request wireless communication link establishment, determine the last address that was received from the apparatus that broadcast the wireless message, encode the last address that was received from the apparatus that broadcast the wireless message into a wireless request message, and transmit the wireless request message.

Accordingly, it will be apparent to persons skilled in the relevant art that various changes in form a and detail can be made therein without departing from the spirit and scope of the invention. The breadth and scope of the present invention should not be limited by any of the above-described exemplary embodiments, but should be defined only in accordance with the following claims and their equivalents.

The invention claimed is:

1. A method, comprising:
associating a plurality of identities with an apparatus;
encoding each of the plurality of identities into different addresses, respectively,
wherein the different addresses include an address portion common to each different address,
wherein encoding each of the plurality of identities into different addresses comprises concatenating a random number with an encoded form of each of the plurality of identities,
wherein the random number is identical for each different address, and
wherein each encoded form of each of the plurality of identities is created by executing an encoding function using the random number and each of the plurality of identities as inputs to the encoding function;
broadcasting each of the different addresses from the apparatus in a separate wireless message; and
listening in the apparatus for a wireless response message that includes information related to one of the different addresses that was most recently broadcast by the apparatus.

2. The method of claim 1, wherein listening in the apparatus for the wireless response message further comprises identifying information corresponding to at least one of the plurality of identities of the apparatus.

3. A method comprising:
receiving, in an apparatus, a wireless message comprising at least an address;
decoding the address in the apparatus in order to obtain an identity corresponding to the received address;
when the identity is known to the apparatus, determining whether to request wireless communication link establishment with an apparatus that broadcast the wireless message; and
if a determination is made to request wireless communication link establishment, determining from the address an address portion that is common to different addresses broadcast by the apparatus that broadcast the wireless message, determining a last address that was received that includes the common address portion, encoding information related to the last address into a wireless request message irrespective of whether the last address corresponds to an identity that is known to the apparatus, and transmitting the wireless request message,
wherein a plurality of identities associated with the apparatus that broadcast the wireless message are each encoded into the different addresses, respectively,
wherein encoding each of the plurality of identities into the different addresses comprises concatenating a random number with an encoded form of each of the plurality of identities,
wherein the random number is identical for each different address, and
wherein each encoded form of each of the plurality of identities is created by executing an encoding function using the random number and each of the plurality of identities as inputs to the encoding function.

4. The method of claim 3, wherein the apparatus disregards the identity if at least one of the identity is not already known to the apparatus or if a determination is made to not request a wireless connection with the apparatus corresponding to the identity.

5. The method of claim 3, wherein encoding information related to the last address into a wireless request message comprises concatenating a random number with an encoded form of an identity that corresponds to the last address.

6. The method of claim 3, wherein the apparatus disregards the identity if no response is received to transmission of the wireless request message.

7. A computer program product comprising computer executable program code recorded on a non-transitory computer readable storage medium, the computer executable program code comprising:
code configured to associate a plurality of identities with an apparatus;
code configured to encode each of the plurality of identities into different addresses, respectively,
wherein the different addresses include an address portion common to each different address, wherein encoding each of the plurality of identities into different addresses comprises concatenating a random number with an encoded form of each of the plurality of identities, wherein the random number is identical for each different address, and wherein each encoded form of each of the plurality of identities is created by executing an encoding function using the random number and each of the plurality of identities as inputs to the encoding function;

code configured to broadcast each of the different addresses from the apparatus in a separate wireless message; and code configured to listen in the apparatus for a wireless response message that includes information related to one of the different addresses that was most recently broadcast by the apparatus.

8. The computer program product of claim 7, wherein listening in the apparatus for the wireless response message further comprises identifying information corresponding to at least one of the plurality of identities of the apparatus.

9. A computer program product comprising computer executable program code recorded on a non-transitory computer readable storage medium, the computer executable program code comprising:

code configured to receive, in an apparatus, a wireless message comprising at least an address;

code configured to decode the address in the apparatus in order to obtain an identity corresponding to the received address;

code configured to, when the identity is known to the apparatus, determine whether to request wireless communication link establishment with an apparatus that broadcast the wireless message; and code configured to, if a determination is made to request wireless communication link establishment, determine from the address an address portion that is common to different addresses broadcast by the apparatus that broadcast the wireless message, determine a last address that was received that includes the common address portion, encode information related to the last address into a wireless request message irrespective of whether the last address corresponds to an identity that is known to the apparatus, and transmit the wireless request message, wherein a plurality of identities associated with the apparatus that broadcast the wireless message are each encoded into the different addresses, respectively, wherein encoding each of the plurality of identities into the different addresses comprises concatenating a random number with an encoded form of each of the plurality of identities, wherein the random number is identical for each different address, and wherein each encoded form of each of the plurality of identities is created by executing an encoding function using the random number and each of the plurality of identities as inputs to the encoding function.

10. The computer program product of claim 9, wherein the apparatus disregards the identity if at least one of the identity is not already known to the apparatus or if a determination is made to not request a wireless connection with the apparatus corresponding to the identity.

11. The computer program product of claim 9, wherein information related to the last address into a wireless request message comprises concatenating a random number with an encoded form of an identity that corresponds to the last address.

12. The computer program product of claim 9, wherein the apparatus disregards the identity if no response is received to transmission of the wireless request message.

13. An apparatus, comprising:

at least one processor; and at least one memory including executable instructions, the at least one memory and the executable instructions being configured to, in cooperation with the at least one processor, cause the apparatus to perform at least the following:

associate a plurality of identities with the apparatus;

encode each of the plurality of identities into different addresses, respectively, wherein the different addresses include an address portion common to each different address, wherein encoding each of the plurality of identities into different addresses comprises concatenating a random number with an encoded form of each of the plurality of identities, wherein the random number is identical for each different address, and wherein each encoded form of each of the plurality of identities is created by executing an encoding function using the random number and each of the plurality of identities as inputs to the encoding function;

broadcast each of the different addresses from the apparatus in a separate wireless message; and listen in the apparatus for a wireless response message that includes information related to one of the different addresses that was most recently broadcast by the apparatus.

14. The apparatus of claim 13, wherein listening in the apparatus for the wireless response message further comprises identifying information corresponding to at least one of the plurality of identities of the apparatus.

15. An apparatus, comprising:

at least one processor; and at least one memory including executable instructions, the at least one memory and the executable instructions being configured to, in cooperation with the at least one processor, cause the apparatus to perform at least the following:

receive, in the apparatus, a wireless message comprising at least an address;

decode the address in the apparatus in order to obtain an identity corresponding to the received address;

when the identity is known to the apparatus, determine whether to request wireless communication link establishment with an apparatus that broadcast the wireless message; and if a determination is made to request wireless communication link establishment, determine from the address an address portion that is common to different addresses broadcast by the apparatus that broadcast the wireless message, determine a last address that was received that includes the common address portion, encode information related to the last address into a wireless request message irrespective of whether the last address corresponds to an identity that is known to the apparatus, and transmit the wireless request message, wherein a plurality of identities associated with the apparatus that broadcast the wireless message are each encoded into the different addresses, respectively, wherein encoding each of the plurality of identities into the different addresses comprises concatenating a random number with an encoded form of each of the plurality of identities, wherein the random number is identical for each different address, and wherein each encoded form of each of the plurality of identities is created by executing an encoding function using the random number and each of the plurality of identities as inputs to the encoding function.

16. The apparatus of claim 15, wherein the apparatus disregards the identity if at least one of the identity is not already known to the apparatus or if a determination is made to not request a wireless connection with the apparatus corresponding to the identity.

17. The apparatus of claim 15, wherein information related to the last address into a wireless request message comprises concatenating a random number with an encoded form of an identity that corresponds to the last address.

18. The apparatus of claim 15, wherein the apparatus disregards the identity if no response is received to transmission of the wireless request message.

19. A system, comprising:
a broadcasting apparatus; and
one or more receiving apparatuses;
the broadcasting apparatus, having a plurality of associated identities, configured to encode each of the plurality of identities into different addresses, respectively,
wherein the different addresses include an address portion common to each different address,
wherein encoding each of the plurality of identities into different addresses comprises concatenating a random number with an encoded form of each of the plurality of identities,
wherein the random number is identical for each different address, and
wherein each encoded form of each of the plurality of identities is created by executing an encoding function using the random number and each of the plurality of identities as inputs to the encoding function,
and broadcast each of the different addresses in a separate wireless message to the one or more receiving apparatuses;
the broadcasting apparatus further configured to listen for a wireless response message that includes information related to one of the different addresses that was most recently broadcast;
the one or more receiving apparatuses configured to receive a wireless message comprising at least an address and decode the address in order to obtain an identity corresponding to the received address; and
the one or more receiving apparatuses further, when the identity is known, configured to determine whether to request wireless communication link establishment with the broadcasting apparatus, and if a determination is made to request wireless communication link establishment, determine from the address an address portion that is common to a plurality of addresses broadcast by the broadcasting apparatus, determine a last address that was received from the broadcasting apparatus that includes the common address portion, encode information related to the last address that was received from the broadcasting apparatus into a wireless request message irrespective of whether the last address corresponds to an identity that is known to the one or more receiving apparatuses, and transmit the wireless request message to the broadcasting apparatus.

* * * * *